(12) United States Patent
Takata

(10) Patent No.: US 9,120,431 B2
(45) Date of Patent: Sep. 1, 2015

(54) IN-VEHICLE ELECTRONIC CONTROL UNIT

(75) Inventor: Michihiro Takata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 247 days.

(21) Appl. No.: 13/431,699

(22) Filed: Mar. 27, 2012

(65) Prior Publication Data
US 2013/0096774 A1    Apr. 18, 2013

(30) Foreign Application Priority Data

Oct. 18, 2011    (JP) .................................. 2011-228610

(51) Int. Cl.
*B60K 15/00* (2006.01)
*B60R 16/02* (2006.01)

(52) U.S. Cl.
CPC ................. *B60R 16/02* (2013.01); *B60K 15/00* (2013.01)

(58) Field of Classification Search
CPC ................................ B60K 15/00; B60R 16/02
See application file for complete search history.

(56) References Cited

U.S. PATENT DOCUMENTS 5,123,459 A * 6/1992 Toshihiro .......................... 141/59
2006/0287804 A1 * 12/2006 Takayanagi ................... 701/112

FOREIGN PATENT DOCUMENTS

| JP | 04-041972 A | 2/1992 |
| JP | 08-121279 A | 5/1996 |
| JP | 2006-347377 A | 12/2006 |

* cited by examiner

*Primary Examiner* — John Q Nguyen
*Assistant Examiner* — Michael Kerrigan
(74) *Attorney, Agent, or Firm* — Sughrue Mion, PLLC; Richard C. Turner

(57) ABSTRACT

An in-vehicle electronic control unit is fed via a power supply relay energized when a power supply switch is closed while the vehicle is in motion. When a filler lid open command switch is closed in a vehicle stop state in which the power supply switch is opened, the power supply relay is energized and a microprocessor starts to operate and continues to energize the power supply relay by generating a self-hold command output, and opens a filler lid as a safety door after performing decompression processing control of a fuel tank. Then, the filler cap is opened and a refuel operation is performed manually. Thereafter, the microprocessor stops the self-hold command output when the filler cap and the filler lid are closed or a predetermined time has elapsed.

12 Claims, 12 Drawing Sheets

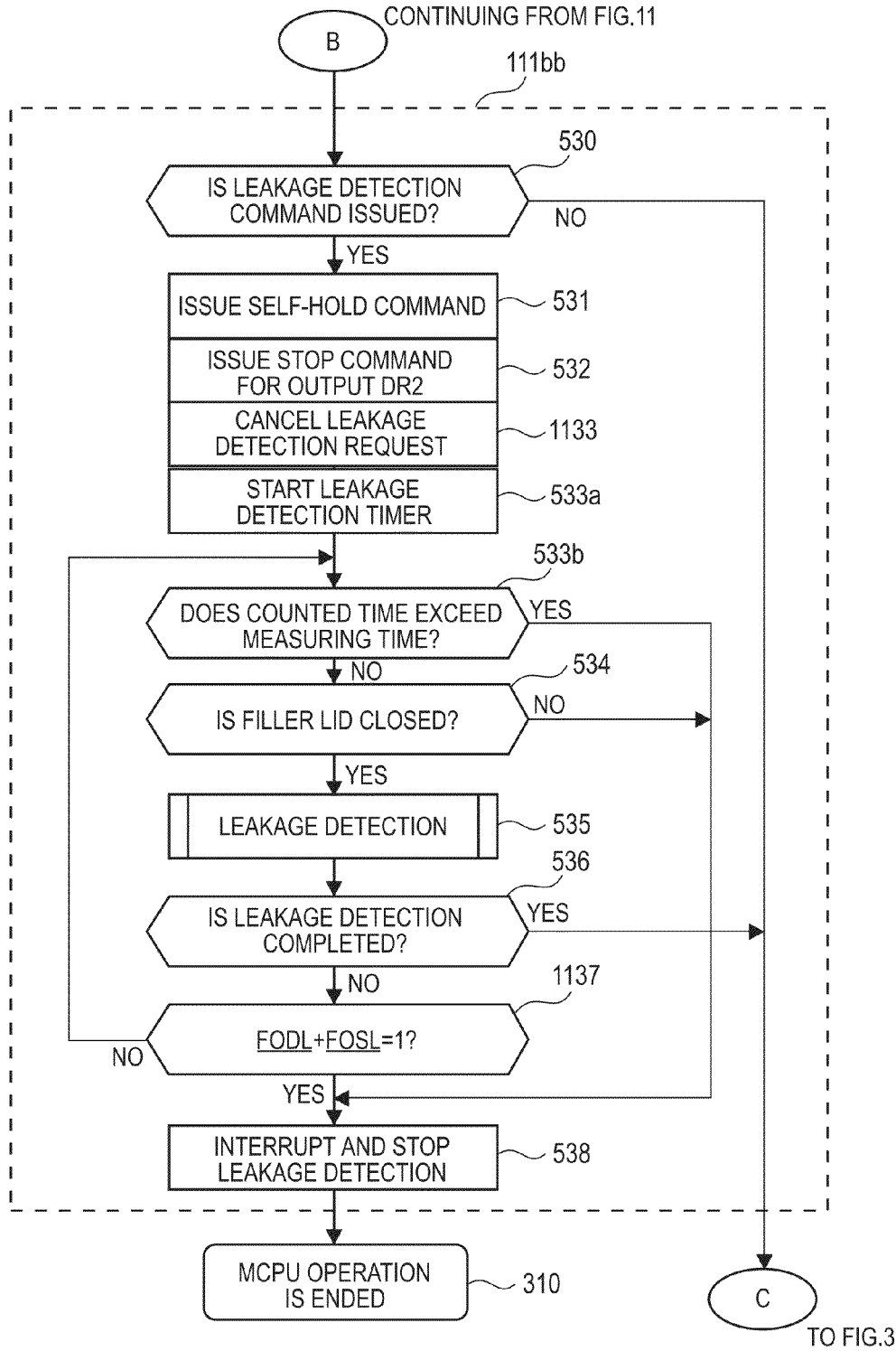

IN-VEHICLE ELECTRONIC CONTROL UNIT

BACKGROUND OF THE INVENTION

1. Field of the Invention

The present invention relates to an in-vehicle electronic control unit furnished with a fuel evaporation preventing function of preventing diffusion of fuel evaporation emission when the vehicle is refueled, and more particularly, to an in-vehicle electronic control unit that prevents overdischarge of an in-vehicle battery when a filler cap provided to close a filler neck or a filler lid provided as a safety door is left open.

2. Description of the Related Art

Regarding an in-vehicle fuel tank storing fuel for an in-vehicle engine, various preventive measures have been taken to prevent evaporated fuel accumulated in the fuel tank from being discharged to the atmosphere when a filler cap put on a filler neck of the fuel tank is opened to refuel a vehicle.

For example, according to Japanese Patent No. 2538101 (Patent Document 1), a switch to detect opening and closing states is provided to each of a filler cap and a filler lid as a safety door of the filler cap. Also, a check valve and a bypass solenoid valve are provided to an evaporation tube connecting a fuel tank and a canister. When both the filler cap and the filler lid are closed while the vehicle is in motion and when both the filler cap and the filler lid are opened while the vehicle is refueled, the solenoid valve is closed by energizing a solenoid. When the vehicle is refueled, the solenoid valve is opened by de-energizing the solenoid in a transition period during which the filler lid is opened first but the filler cap is not opened yet. Consequently, because evaporated fuel in the fuel tank is introduced into the canister via a bypass channel by way of the evaporation tube, the evaporated fuel is not forced out to the atmosphere by an internal pressure of the fuel tank when the filler cap is opened. Air pollution can be therefore prevented.

According to Japanese Patent No. 2962166 (Patent Document 2), when a refuel switch is operated before the vehicle is refueled, a solenoid valve provided to a pipe connecting a fuel tank and a canister is opened and a compressor starts to operate under the control of an electronic control unit, so that fuel evaporation emission in the fuel tank is sent into a reservoir via the pipe. Thereafter, when the internal pressure of the fuel tank detected by a pressure sensor drops to or below atmospheric pressure, the solenoid valve is closed and the compressor stops operating. A filler lid opening motor is then driven and the filler lid is opened so that the vehicle is refueled. Consequently, it becomes possible to prevent a discharge of fuel evaporation emission from the fuel tank when the vehicle is refueled.

According to Japanese Patent No. 4567534 (Patent Document 3), a vehicle control unit, which is a fuel control module controlling electrical components provided to a fuel supply system and installed separately from an engine control module controlling the engine, determines whether there is a refuel request to the fuel tank depending on whether a filler cap or a fuel filler lid is opened while the engine is at rest. When there is no refuel request, the vehicle control unit shifts to a low power consumption mode. The vehicle control unit resumes to a normal mode upon issuance of a refuel request and outputs a drive signal to open the solenoid valve so that the vehicle is refueled. Also, the vehicle control unit is forced to shift to the low power consumption mode when a refuel requesting state to the fuel tank continues for a predetermined time or longer. The low power consumption mode is a mode in which no control output is generated and a microcomputer is brought into a low power consuming state by lowering a clock frequency of a CPU and by actuating only a portion that reads an external signal and a portion that performs a communication function.

Patent Document 1: Japanese Patent No. 2538101 (Claim 1 and FIG. 1)
Patent Document 2: Japanese Patent No. 2962166 (Claim 2, Paragraph [0022], and FIG. 1)
Patent Document 3: Japanese Patent No. 4567534 (Claims 1 through 3, Paragraphs [0022] and [0023], and FIG. 1)

A fuel tank apparatus of Patent Document 1 de-energizes the solenoid upon occurrence of a contact failure in one of the filler lid switch and the filler cap switch under circumstances where the filler lid and the filler cap are closed and both the filler lid switch and the filler cap switch must be closed. Accordingly, the solenoid valve is opened constantly and there arises a fail-safe problem.

Under circumstances where the filler lid and the filler cap are closed and both the filler lid switch and the filler cap switch are closed normally, a pair of a relay and a solenoid is energized to close the solenoid valve constantly. Accordingly, a load current is flown into a pair of the relay and the solenoid while the vehicle is in a parked state and overdischarge occurs in the in-vehicle battery. Hence, there arises a problem in terms of power saving. The power saving problem may be solved by stopping power feeding to a pair of the relay and the solenoid when a power supply switch is opened. However, in order to refuel the vehicle while the power supply switch is opened, it is necessary to configure in such a manner that power is fed to a pair of the relay and the solenoid even when the power supply switch is opened. After all, the fuel tank apparatus is of a configuration that defies a solution of the power saving problem.

In a fuel evaporation preventing apparatus of Patent Document 2, a filler lid open command switch, a filler lid opening detection switch, various solenoid valves, and a filler lid opening motor are under the control of the electronic control unit. This configuration raises a problem that it is impossible to refuel the vehicle in a parked state. It should be noted, however, that the electronic control unit remains in an operating state and is capable of running a control program for preventing fuel evaporation while an ignition key is turned at an ON position and at least until a predetermined time (a time sufficiently longer than a maximum refuel time) elapses since the ignition key is turned OFF. However, when an individual wishes to perform a refuel operation after an elapse of the predetermined time, the ignition key has to be turned to the ON position first. Hence, the power supply may possibly be turned OFF during the refuel operation unless the predetermined time is sufficiently long. It therefore becomes necessary to feed the electronic control unit idly for a long time. Accordingly, in a case where a microprocessor is incorporated into the electronic control unit, it is required to use a low-power-consuming microprocessor having a small program memory capacity and operating at low speeds.

The vehicle control unit of Patent Document 3 uses two types of control modules that handle the same input and output signal. It is therefore necessary to exchange signals with each other and the fuel control module requires a complex microprocessor operating in two modes. Accordingly, there is a problem that it is necessary to constantly feed more modules even in a low power consumption mode. The engine control module normally incorporates a low-power-consuming soak timer circuit to detect fuel evaporation and the soak timer circuit is constantly fed from the in-vehicle battery.

The invention has an object to solve the problems discussed above and provides an in-vehicle electronic control unit capable of performing decompression processing of a fuel tank without requiring a new control unit so as to prevent diffusion of fuel evaporation emission from the fuel tank when a filler cap is opened.

SUMMARY OF THE INVENTION

An in-vehicle electronic control unit according to an aspect of the invention is an in-vehicle electronic control unit fed via an output contact in a power supply relay that is directly energized from an in-vehicle battery when a power supply switch for vehicle operation is closed. The in-vehicle electronic control unit includes a microprocessor that drives an electrical load group including at least fuel injection solenoid valves under control in response to an operation state of an in-vehicle sensor group, and a program memory that operates in cooperation with the microprocessor and pre-stores a control program realizing a decompression processing portion including a cut-off timer in addition to a control program realizing an input and output control portion for vehicle operation.

The power supply relay is directly energized from the in-vehicle battery via an energizing transistor in a vehicle stop state in which the power supply switch is not closed when at least one of a filler lid open command switch and a filler lid opening detection switch is closed, and operated under timed energization so as not to be energized when the filler lid opening detection switch remains in a closed state over a predetermined limit period while operated under self-hold energization by a self-hold command output generated by the microprocessor when directly energized and the microprocessor starts to operate.

The filler lid opening detection switch operates in response to closing and opening states of a filler lid provided on an outer surface of a filler cap closing an opening end of a fuel pipe communicating with a fuel tank and is closed when the filler cap is in a manually openable and closable state because the filler lid is brought into a fully opened state, a half opened state, or a closing and locking cancelled state by driving of a filler opening actuator or a manual operation.

The decompression processing portion discharges an internal pressure of the fuel tank to atmosphere via a canister adsorbing evaporated fuel by energizing and opening a sealing valve opening solenoid valve provided between the fuel tank and the canister at least once when the filler lid open command switch or the filler lid opening detection switch is closed, and in a case where the filler opening actuator is provided, drives the filler opening actuator to open the filler lid after an elapse of a predetermined time since the filler lid opening detection switch is closed or after it is determined that the internal pressure of the fuel tank dropped within a predetermined threshold range in the vicinity of atmospheric pressure.

The decompression processing portion stops the self-hold command output because the filler cap and the filler lid are closed upon completion of refueling and the sealing valve opening solenoid valve is de-energized and closed or de-energizes and seals the sealing valve opening solenoid valve because the self-hold command output stops.

The cut-off timer stops the self-hold command output when the filler lid is not closed even after an elapse of a predetermined cut-off threshold time since the filler lid open command switch or the filler lid opening detection switch is closed.

The in-vehicle electronic control unit configured as above uses the microprocessor that performs an input and output control operation while the vehicle is in motion as the power supply switch is closed. The microprocessor is operated even in a vehicle stop state in which the power supply switch is opened, so that the filler cap is opened manually after the sealing valve opening solenoid valve used to discharge an internal pressure of the fuel tank to the atmosphere is energized and opened in response to an action of the filler lid open command switch or the filler lid opening detection switch and that the sealing valve opening solenoid valve is de-energized and closed before or after the filler cap and the filler lid are closed manually upon completion of refueling. It thus becomes possible to perform decompression processing of the fuel tank without requiring a new control unit. Hence there can be achieved an advantage that evaporated fuel is prevented from flowing out of the fuel tank when the filler cap is opened.

The foregoing and other objects, features, aspects, and advantages of the present invention will become more apparent from the following detailed description of the present invention when taken conjunction with the accompanying drawings.

BRIEF DESCRIPTION OF THE DRAWINGS

FIG. 12 is another flowchart depicting the operation of the main CPU in the in-vehicle electronic control unit according to the third embodiment of the invention.

DETAILED DESCRIPTION OF THE INVENTION

Hereinafter, preferred embodiments of an in-vehicle electronic control unit of the invention will be described with reference to the drawings.

First Embodiment

Figure 1:
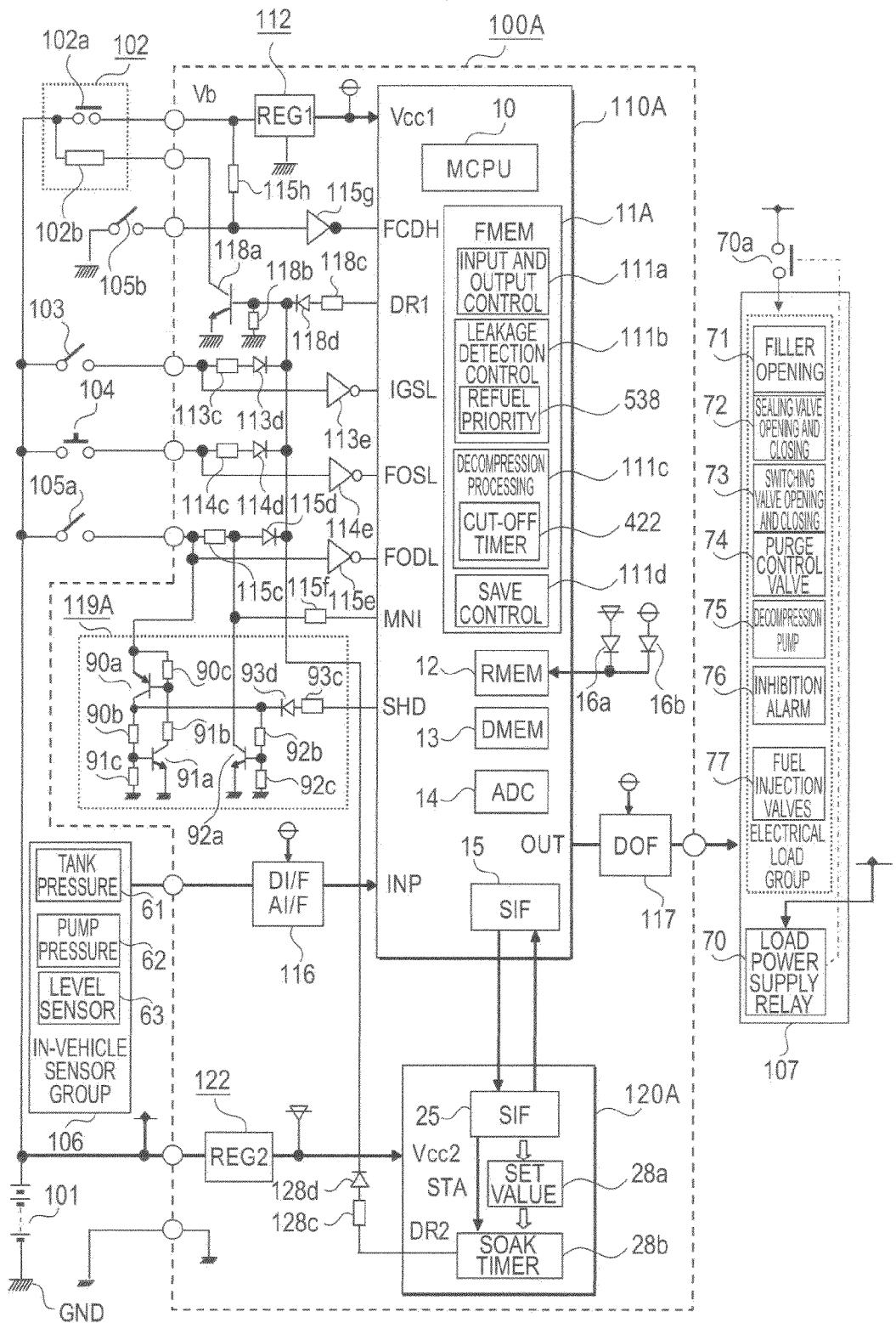
FIG. 1 is an overall circuit block diagram of an in-vehicle electronic control unit according to a first embodiment of the invention.

A description will be given to FIG. 1 showing an overall circuit block diagram of an in-vehicle electronic control unit according to a first embodiment of the invention.

Referring to FIG. 1, an in-vehicle electronic control unit 100A housed in a closed chassis is, for example, an in-vehicle engine control unit and chiefly formed of a microprocessor 10. A power supply, which is a power supply voltage Vb, is supplied to the microprocessor 10 via an output contact 102a in a power supply relay 102 from an in-vehicle battery 101 connected to a vehicle body as a ground circuit GND at a negative terminal. The microprocessor 10 drives an in-vehicle electrical load group 107 under the control according to an operation state of an in-vehicle sensor group 106 connected to an outside via unillustrated connecting connectors and contents of control programs stored in a program memory 11A described below.

A power supply switch 103, a filler lid open command switch 104, and a filler lid opening detection switch 105a are connected to the in-vehicle battery 101 at one ends and each energizes an exciting coil 102b in the power supply relay 102 via an energizing transistor 118a described below.

Figure 2:
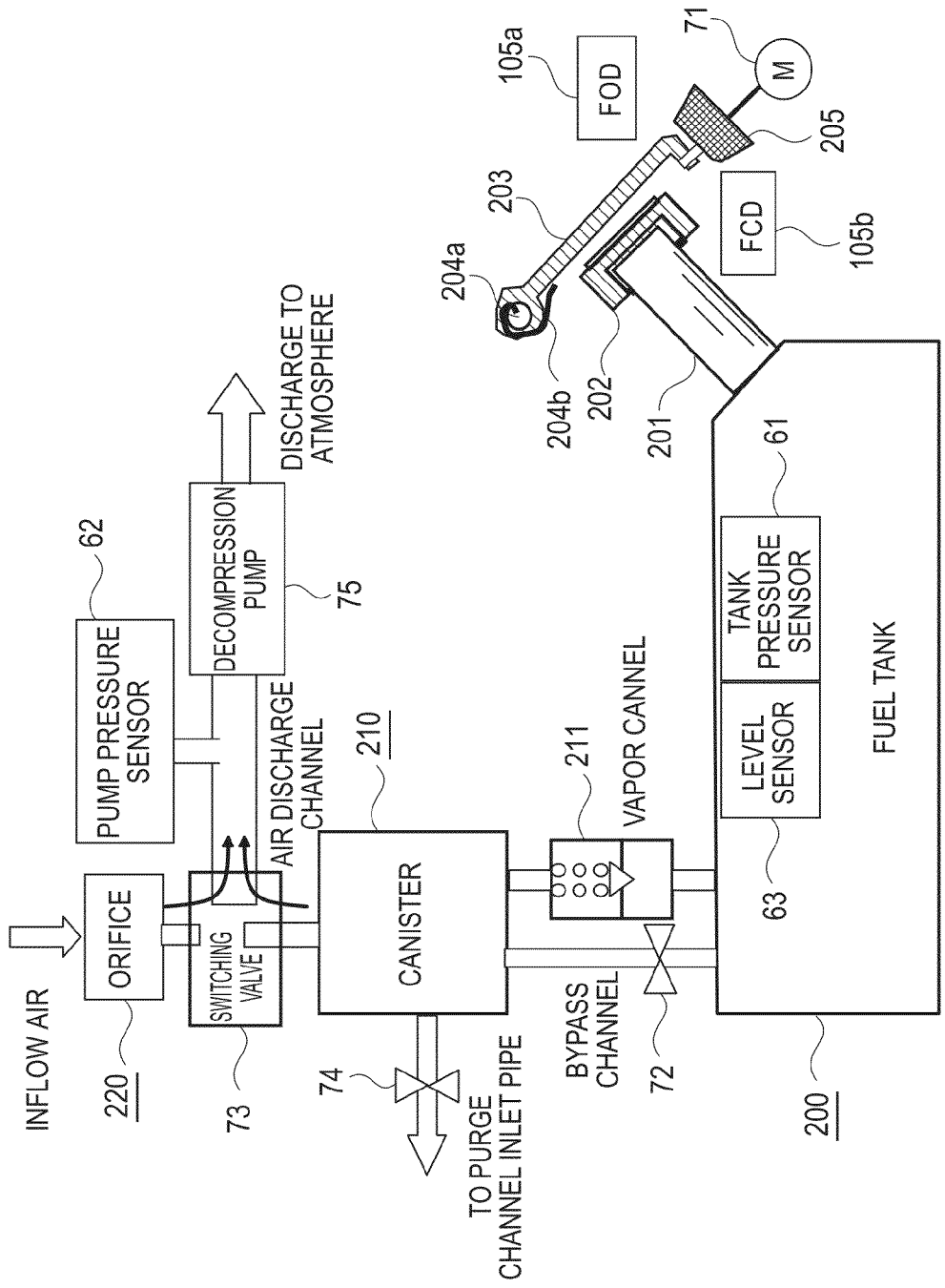
FIG. 2 is a view schematically showing a configuration of input and output peripheral devices of the in-vehicle electronic control unit according to the first embodiment of the invention.

The filler lid opening detection switch 105a is a switch that is closed when a filler lid 203 described below with reference to FIG. 2 is a half opened state and fully openable by a manual operation or in a fully opened state. On the contrary, a filler lid closing detection switch 105b connected to the ground circuit GND at one end is a switch that is closed when the filler lid 203 is closed and it is sure that the filler cap 202 is closed.

The in-vehicle sensor group 106 includes, for example, an analog sensor that detects a degree of depressing on an accelerator pedal and a throttle valve angle and an opening and closing sensor that detects a vehicle speed and an engine speed. The in-vehicle sensor group 106 also includes a tank pressure sensor 61 that measures an internal pressure of the fuel tank 200, a pump pressure sensor 62 located upstream of a decompression pump 75 installed in an air discharge channel of the canister 210, and a level sensor 63 that measures an amount of fuel in the fuel tank 200, all of which will be described below with reference to FIG. 2.

The in-vehicle electrical load group 107 includes devices that drive the in-vehicle engine, such as sparking coils (in the case of a gasoline engine), fuel injection solenoid valves 77, and a throttle valve angle control motor, under control. The in-vehicle electrical load group 107 also includes a filler opening actuator 71, a sealing valve opening solenoid valve 72, a switching solenoid valve 73, a purge solenoid valve 74, and a decompression pump 75, all of which will be described below with reference to FIG. 2, as well as an opening inhibition alarm 76 and a load power supply relay 70 feeding the foregoing electrical loads. When the load power supply relay 70 is energized, power is fed from the in-vehicle battery 101 to the in-vehicle electrical load group 107 via an output contact 70a in the load power supply relay 70.

A main power supply circuit 112 provided inside the in-vehicle electronic control unit 100A is fed from the in-vehicle battery 101 via the output contact 102a in the power supply relay 102 and generates a main control power supply voltage Vcc1, which is an output voltage stabilized, for example, at DC 5 V, and feeds a main control circuit portion 110A. The main control circuit portion 110A is formed of the microprocessor 10, the program memory 11A, for example, a non-volatile flash memory, a volatile RAM memory 12 for computation processing, a non-volatile data memory 13, a multi-channel A-to-D converter 14, and a serial parallel converter 15, all of which are interconnected via buses. The program memory 11A pre-stores control programs realizing an input and output control portion 111a, a leakage detection control portion 111b including a refuel priority portion 538, a decompression processing portion 111c including a cut-off timer 422, and a save processing portion 111d, all of which will be described below with reference to FIG. 3 through FIG. 5.

A sub-power supply circuit 122 is directly fed from the in-vehicle battery 101 and generates a sub-control power supply voltage Vcc2, which is an output voltage stabilized, for example, at DC 5 V, and feeds a sub-control circuit portion 120A. The RAM memory 12 in the main control circuit portion 110A is fed by both the sub-control power supply voltage Vcc2 and the main control power supply voltage Vcc1 via diodes 16a and 16b, respectively.

The sub-control circuit portion 120A is provided with a serial parallel converter 25 connected in serial to the serial parallel converter 15 and a soak timer 28b, which is a long-run timer formed, for example, of hardware. Waking hours as the target are sent from the microprocessor 10 and set in a set value register of the soak timer 28b or a current value register 28a. The soak timer 28b starts a timekeeping operation according to a timekeeping start command signal STA sent immediately before the microprocessor 10 is stopped, and generates a waking command signal output DR2, for example, five hours later when the time is up.

A drive resistor 113c and a series diode 113d are connected in series to each other and connected between the power supply switch 103 and a base terminal of the energizing transistor 118a. A NOT element 113e inputs into the microprocessor 10 a power supply switch closing signal IGSL that shifts to a logic level "L" when the power supply switch 103 is closed.

A drive resistor 114c and a series diode 114d are connected in series to each other and connected between the filler lid open command switch 104 and the base terminal of the energizing transistor 118a. A NOT element 114e inputs into the microprocessor 10 a filler open command signal FOSL that shifts to a logic level "L" when the filler lid open command switch 104 is closed.

A drive resistor 115c and a series diode 115d are connected in series to each other and connected between the filler lid opening detection switch 105a and the base terminal of the energizing transistor 118a. A NOT element 115e inputs into the microprocessor 10 a filler opening detection signal FODL that shifts to a logic level "L" when the filler lid opening detection switch 105a is closed.

A power supply voltage Vb is applied to the filler lid closing detection switch 105b via a pull-up resistor 115h and a NOT element 115g inputs into the microprocessor 10 a filler closing detection signal FCDH that shifts to a logic level "H" when the filler lid closing detection switch 105b is closed.

A drive resistor 118c and a series diode 118d are connected in series to each other and connected between a self-hold command output DR1 generated by the microprocessor 10 and the base terminal of the energizing transistor 118a.

A drive resistor 128c and a series diode 128d are connected in series to each other and connected between the waking command signal output DR2 and the base terminal of the energizing transistor 118a.

The energizing transistor 118a is an NPN transistor connected to the ground circuit GND at an emitter terminal, and a collector terminal thereof is connected in series to the exciting coil 102b in the power supply relay 102. An opening stabilizing resistor 118b is connected between the base terminal and the emitter terminal.

An input interface circuit 116 is connected to each input signal of the in-vehicle sensor group 106 and supplies the microprocessor 10 with a sensor input signal INP. It is an intermediate circuit for an analog signal and an opening and closing signal and furnished with a function of converting a signal voltage level and a noise filtering function. An output interface circuit 117 is formed of plural power transistors operating in response to a load drive signal OUT generated by the microprocessor 10. The electrical loads in the in-vehicle electrical load group 107 are individually connected to output terminals of the respective power transistors.

A timed energizing circuit 119A includes a first transistor 90a, which is a PNP transistor, a second transistor 91a and a third transistor 92a, which are NPN transistors. These three transistors 90a through 92a are fed from the in-vehicle battery 101 via the filler lid opening detection switch 105a and form a latch circuit. A first drive resistor 90b is connected between a collector terminal of the first transistor 90a and a base terminal of the second transistor 91a and drives the second transistor 91a to conduct. A second drive resistor 91b is connected between a collector terminal of the second transistor 91a and a base terminal of the first transistor 90a and drives the first transistor 90a to conduct. A third drive resistor 92b is connected between a collector terminal of the first transistor 90a and a base terminal of the third transistor 92a and drives the third transistor 92a to conduct. A drive resistor 93c and a series diode 93d are connected in series to each other and drives the second transistor 91a and the third transistor 92a to conduct according to a shutdown command SHD issued by the microprocessor 10.

First through third opening stabilizing resistor 90c, 91c, and 92c are connected between emitter terminals and the base terminals of the first through third transistors 90a, 91a, and 92a, respectively. A collector terminal of the third transistor 92a is connected to a connection point of the drive resistor 115c and the series diode 115d connected in series to the filler lid opening detection switch 105a and inputs into the microprocessor 10 a monitor signal MNI via a monitor circuit resistor 115f.

A description will now be given to FIG. 2, which is a view schematically showing a configuration of input and output peripheral devices of FIG. 1.

Referring to FIG. 2, the fuel tank 200 is provided with the tank pressure sensor 61 that measures an internal pressure of the fuel tank 200 and the level sensor 63 that measures an amount of fuel in the fuel tank 200. An opening of a fuel pipe 201 communicating with the fuel tank 200 is closed with the filler cap 202 and the filler lid 203 as a safety door is provided on the outer surface of the filler cap 202.

The filler lid 203 is manually closed against an accumulator spring 204b wound around a lid spindle 204a and closed and locked by a closing and locking mechanism 205. The closing and locking mechanism 205 is manually released by an unillustrated remote wire and the filler lid 203 is half opened by the released accumulator spring 204b so that the filler lid 203 is fully opened by a manual operation. The closed and locked state can be also cancelled by the filler opening actuator 71 additionally provided to the remote wire.

The filler lid opening detection switch 105a is a switch that is closed when the closed and locked state of the filler lid 203 is cancelled by the filler opening actuator 71 or a manual operation and the filler lid 203 is in a half or fully opened state. The filler lid closing detection switch 105b is a switch that is closed when the filler lid 203 is closed and it is sure that the filler cap 202 is closed.

The canister 210 incorporates, for example, an activated carbon filter, to adsorb evaporated fuel and communicates with the fuel tank 200 via a vapor channel in which a check valve 211 is installed. When an internal pressure of the fuel tank 200 exceeds a predetermined value, the check valve 211 is opened so that air containing evaporated fuel flows into the canister 210. Air purified in the canister 210 is discharged to the atmosphere via the switching solenoid valve 73 and the decompression pump 75 both described below. Meanwhile, the evaporated fuel isolated in the canister 210 is collected into intake pipes of the engine via a purge channel in which the purge solenoid valve 74 is installed, and sucked into cylinders by a negative pressure and burnt therein.

The bypass channel bringing the fuel tank 200 and the canister 210 into communication is provided with the sealing valve opening solenoid valve 72. When the sealing valve opening solenoid valve 72 is fed and energized, the bypass channel is opened so that air containing evaporated fuel flows into the canister 210 even when the check valve 211 is not opened.

The switching solenoid valve 73, the pump pressure sensor 62, and the decompression pump 75 are installed in the air discharge channel of the canister 210. When the switching solenoid valve 73 is de-energized, air inside the canister 210 is decompressed by the decompression pump 75. When fed and energized, the switching solenoid valve 73 switches to the side of an orifice 220 used as the reference for a leakage detection and the decompression pump 75 sucks in air flowing in from the orifice 220.

The orifice 220 has a flow channel narrow mouth equivalent to a leakage allowable narrow mouth for the fuel tank 200. Hence, a measured value in the pump pressure sensor 62 when air is taken in from the orifice 220 by driving the decompression pump 75 is used as a comparative reference value. When the decompression pump 75 is driven after both the sealing valve opening solenoid valve 72 and the switching solenoid valve 73 are fed and energized, air in the fuel tank 200 is sucked in by the decompression pump 75 and the measured value in the pump pressure sensor 62 varies with sizes of the leakage narrow mouths of the fuel tank 200 and the connected pipe channels. Because a sufficient negative pressure is not obtained when the leakage narrow mouths are large, by comparing the measured value with the comparative reference value obtained using the orifice 220, it becomes possible to determine whether the leakage narrow mouths are smaller than the allowable leakage narrow mouth.

A function and an operation of the in-vehicle electronic control unit of the first embodiment configured as is shown in FIG. 1 will now be described in detail using flowcharts of FIG. 3 through FIG. 5 and time flowcharts of FIGS. 6A through 6H and 6J through 6N.

Firstly, a brief description will be given to FIG. 1 and FIG. 2. When the power supply switch 103 is closed to operate the vehicle, a base current of the energizing transistor 118a is supplied via the drive resistor 113c and the series diode 113d and the energizing transistor 118a starts conducting. Accordingly, the exciting coil 102b in the power supply relay 102 is energized and the output contact 102a in the power supply relay 102 is closed. Then, the main power supply circuit 112 in the in-vehicle electronic control unit 100A is fed and the main control power supply voltage Vcc1 is applied to the main control circuit portion 110A. The microprocessor 10 thus starts to operate and drives the in-vehicle electrical load group 107, for example, fuel injection solenoid valves, sparking coils, or a throttle valve angle control motor, under control according to an operation state of the in-vehicle sensor group 106 and contents of a control program pre-stored in the program memory 11A to realize the input and output control portion 111a.

Once the microprocessor 10 starts to operate, a base current of the energizing transistor 118a is supplied from the self-hold command output DR1 generated by the microprocessor 10 via the drive resistor 118c and the series diode 118d, so that the power supply relay 102 is operated under self-hold energization by the microprocessor 10.

When the power supply switch 103 is opened as the vehicle is stopped, the microprocessor 10 is continuously fed because the power supply relay 102 is continuously energized by the self-hold command output DR1 and runs a control program realizing the save processing portion 111d during this continuous feeding period. By running this control program, the self-hold command output DR1 is cancelled to open the output contact 102a by de-energizing the power supply relay 102 only after a completion of processing such as to transfer and save learning information and abnormality occurrence information acquired and stored, for example, in the RAM memory 12 while the vehicle is in motion into the non-volatile data memory 13 and to send a timekeeping start command signal STA to the soak timer 28b.

The continuous feeding period is a time, for example, as short as or shorter than 0.1 sec. In contrast, the soak timer 28b generates the waking command signal output DR2 at the timing when the engine is cooled sufficiently, for example, five hours later since the timekeeping start command signal STA is received or the microprocessor 10 stops operating.

When the filler lid open command switch 104 or the filler lid opening detection switch 105a is closed in a parked state in which the power supply switch 103 is opened, a base current of the energizing transistor 118a is supplied via the drive resistors 114c and 115c and the series diodes 114d and 115d and the power supply relay 102 is energized. Then, the microprocessor 10 is started and not only generates the self-hold command output DR1 but also runs the control program realizing the decompression processing portion 111c described below. The self-hold command output DR1 is cancelled and the power supply relay 102 is de-energized when the filler lid 203 is manually closed upon completion of refueling or when a cut-off threshold time T1, for example, 20 min, has elapsed.

However, in a case where the filler lid opening detection switch 105a is kept closed because the filler lid 203 is left open, the shutdown command SHD generated by the microprocessor 10 shifts to a logic level "H". Accordingly, the second and third transistors 91a and 92a are driven to conduct. Consequently, the first transistor 90a is also driven to conduct, so that the first transistor 90a supplies a base current to the second and third transistors 91a and 92a via the first and third drive resistors 90b and 92b, respectively, while the second transistor 91a supplies a base current to the first transistor 90a via the second drive resistor 91b.

Hence, even when the shutdown command SHD is cancelled, the first and second transistors 90a and 91a form a latch circuit and maintain a mutually conducting state. The third transistor 92a driven to conduct from the first transistor 90a via the second drive resistor 92b cuts off a supply of the base current from the filler lid opening detection switch 105a to the energizing transistor 118a. Consequently, even when the filler lid opening detection switch 105a is kept closed, the power supply relay 102 is not continuously energized. It should be noted, however, that once the filler lid opening detection switch 105a is opened because the filler lid 203 is closed, a memorized state by the first and second transistors 90a and 91a is cancelled and a base current of the energizing transistor 118a is supplied via the drive resistor 115c and the series diode 115d when the filler lid opening detection switch 105a is closed again. The microprocessor 10 monitors whether the timed energizing circuit 119A is operating normally according to the shutdown command SHD so that the third transistor 92a, which is a cut-off transistor, is continuously conducting by using the monitor signal MNI.

Referring to FIG. 2, the filler cap 202 is fastened inside the filler lid 203 with an unillustrated chain so as not to be lost and the filler lid 203 cannot be closed unless the filler cap 202 is put in place. Also, the filler lid closing detection switch 105b cannot be closed unless the filler cap 202 is put on the filler neck of the fuel pipe 201 in a reliable manner.

Referring to FIG. 1, the filler lid closing detection switch 105b is provided to a sink circuit that is connected to the ground circuit GND and becomes effective when the output contact 102a in the power supply relay 102 is closed. In contrast, the filler lid open command switch 104 and the filler lid opening detection switch 105a are provided to a source circuit connected to the in-vehicle battery 101. Hence, not only is it possible to energize the power supply relay 102, but it is also possible to maintain an operation state of the timed energizing circuit 119A even when the power supply relay 102 is de-energized.

Figure 3:
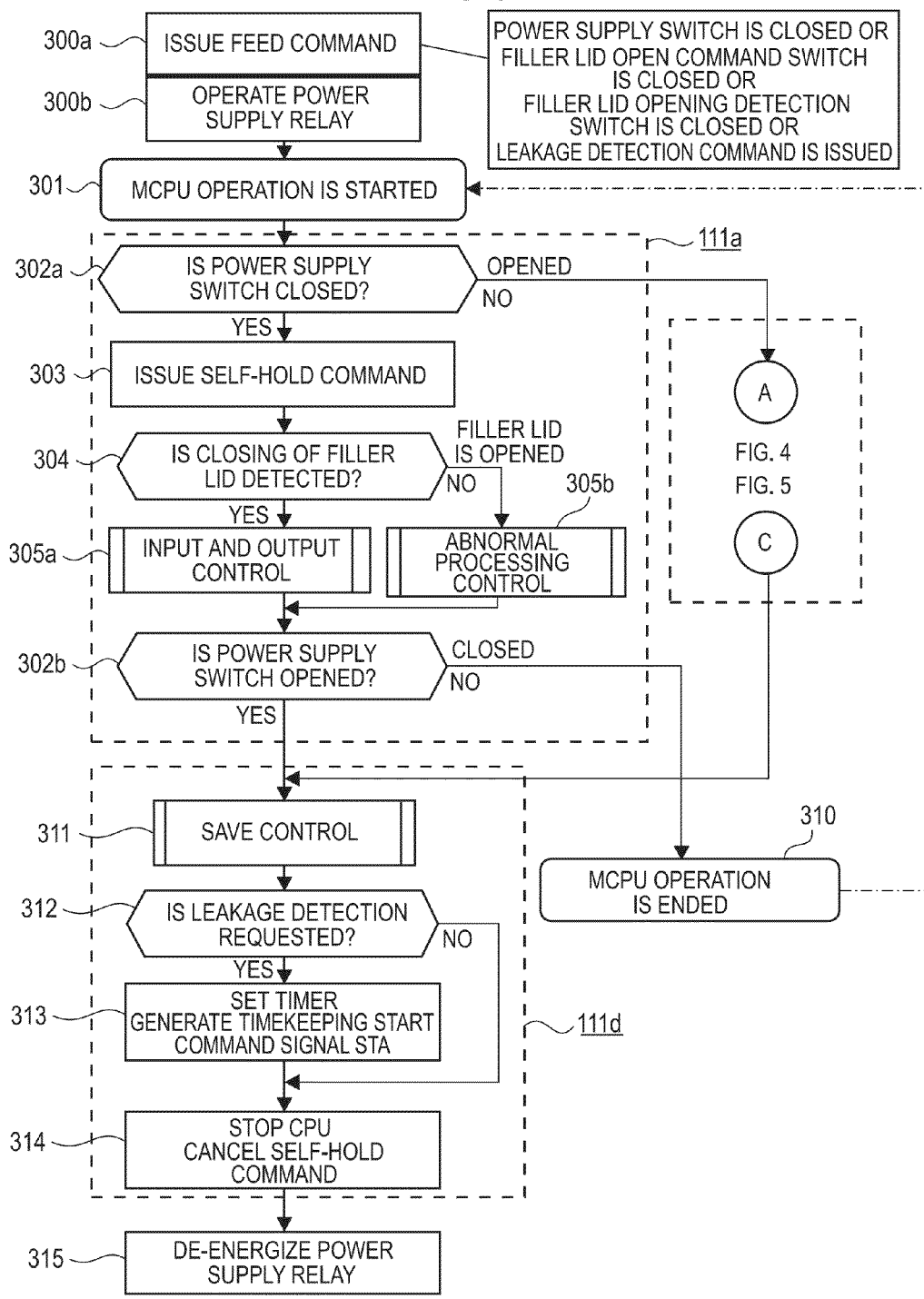
FIG. 3 is a flowchart depicting an operation of the in-vehicle electronic control unit according to the first embodiment of the invention.

Referring to FIG. 3, in Step 300a, a conduct command for the energizing transistor 118a is issued when the power supply switch 103 is closed, the filler lid open command switch 104 or the filler lid opening detection switch 105a is closed, or the waking command signal output DR2 shifts to a logic level "H". In subsequent Step 300b, the power supply relay 102 starts to operate and the microprocessor 10 starts to operate in subsequent Step 301.

Subsequent Step 302a is a determination step in which it is determined whether the power supply switch 103 is closed by monitoring the power supply switch closing signal IGSL. A determination of YES is made when the power supply switch 103 is closed and the flow proceeds to Step 303. A determination of NO is made when the power supply switch 103 is not closed and the flow proceeds to Step 420 of FIG. 4 via a relay terminal A.

After the self-hold command output DR1 is generated in Step 303, the flow proceeds to Step 304. Step 304 is a determination step in which it is determined whether the filler lid closing detection switch 105b is closed by monitoring the filler closing detection signal FCDH. A determination of YES is made when the filler lid closing detection switch 105b is closed and the flow proceeds to Step Block 305a. A determination of NO is made when the filler lid closing detection switch 105b is not closed and the flow proceeds to to Step Block 305b.

In Step Block 305a, the flow periodically proceeds to Step 302b while engine control, such as engine start control, fuel injection control, ignition control, and throttle valve angle control, is performed.

In Step Block 305b, input and output control is performed in the same manner as in Step Block 305a except that engine start control is inhibited and at least an abnormality is notified in a case where the engine is already running.

Step 302b is a determination step performed continuously from Step Block 305a or Step Block 305b, in which it is determined whether the power supply switch 103 is opened by monitoring the power supply switch closing signal IGSL in the same manner as in Step 302a. A determination of NO is made when the power supply switch 103 is not opened and the flow proceeds to operation ending Step 310. A determination of YES is made when the power supply switch 103 is opened and the flow proceeds to Step Block 311.

In operation ending Step 310, another control program is run, and operation starting Step 301 is activated again within a predetermined time, for example, 10 msec or shorter. When the power supply switch 103 is closed, the self-hold command output DR1 is continuously generated by circulating Step 302a, Step 303, Step 304, Step Block 305a or 305b, Step 302b, Step 310, and Step 301, and the input and output control in Step Block 305a or the abnormality processing and the input output control in Step Block 305b are performed.

In Step Block 311 activated in a case where a determination made in Step 302b is YES and the power supply switch 103 is opened, or activated from Step 423b of FIG. 4 described below or Step 530 or Step 536 of FIG. 5 described below via a relay terminal C, learning information and abnormality occurrence information acquired and stored in the RAM memory 12 while the vehicle is in motion are transferred and saved in the non-volatile data memory 13. Thereafter, the flow proceeds to Step 312.

Step 312 is a determination step in which it is determined whether a leakage detection is necessary. A determination of YES is made when a leakage detection is to be performed and the flow proceeds to Step 313. A determination of NO is made when a leakage detection is not necessary this time because a leakage detection is performed last time, and the flow proceeds to Step 314.

After a setting of waking hours and the timekeeping start command signal STA are sent to the soak timer 28b in Step 313, the flow proceeds to Step 314. In Step 314, the self-hold command output DR1 generated in Step 303, Step 421a of FIG. 4 described below, or Step 531 of FIG. 5 described below is cancelled and the microprocessor 10 stops operating by itself. Consequently, the power supply relay 102 is de-energized in Step 315. Step Block 111a made up of a series of Step 302a through Step 302b corresponds to the input and output control portion while the vehicle is in motion and Step Block 111d made up of a series of Step Block 311 through Step 314 corresponds to the save processing portion.

Figure 4:
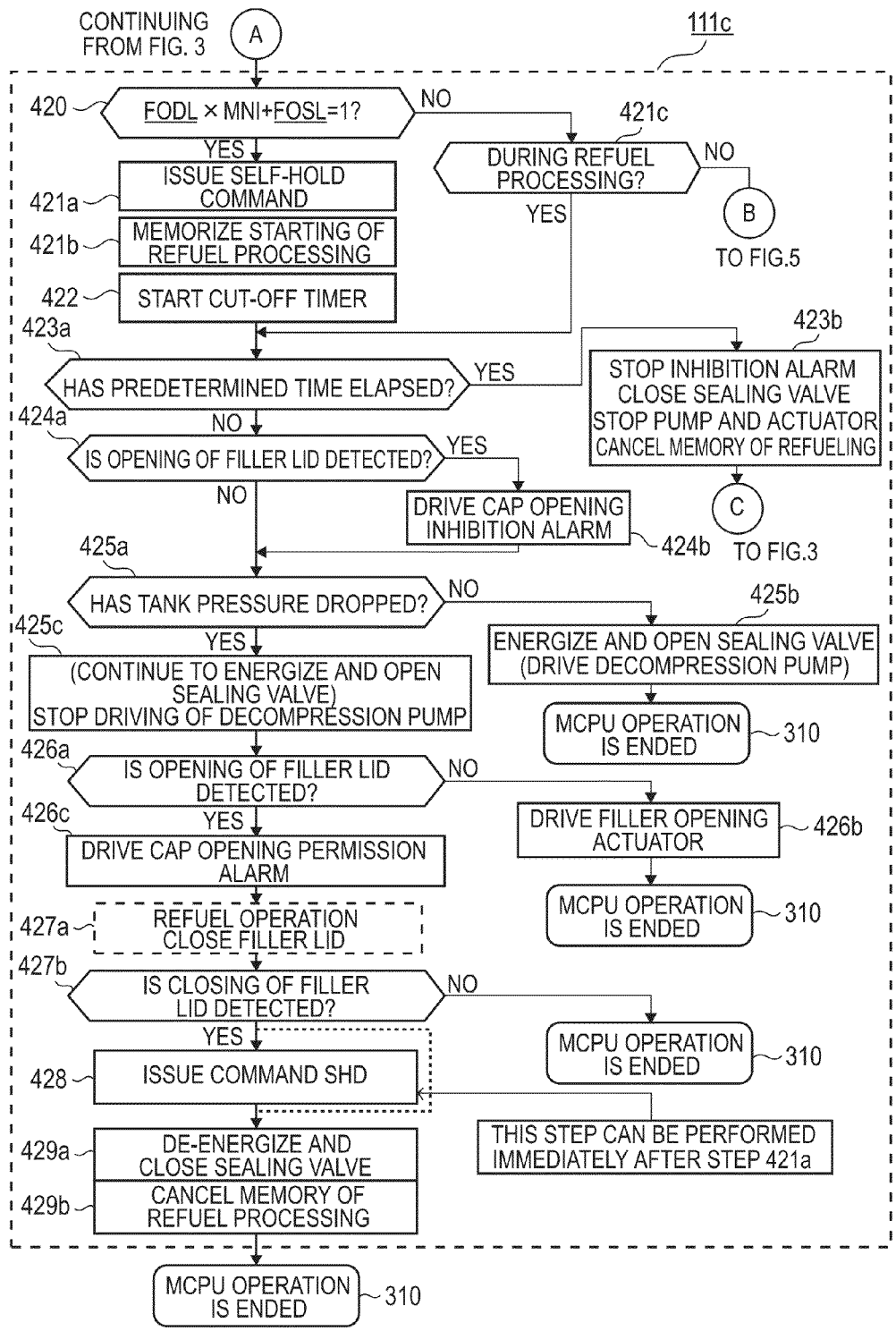
FIG. 4 is another flowchart depicting the operation of the in-vehicle electronic control unit according to the first embodiment of the invention.

Referring to FIG. 4, Step 420 is a determination step activated via the relay terminal A when the determination made in Step 302a of FIG. 3 is NO and the power supply switch 103 is opened, in which it is determined whether the filler lid opening detection switch 105a is closed and the logic level of the monitor signal MNI is "H" or whether the filler lid open command switch 104 is closed by monitoring the filler open command signal FOSL, the filler opening detection signal FODL, and the monitor signal MNI. When at least either the filler lid opening detection switch 105a or the filler lid open command switch 104 is closed, a determination of YES is made and the flow proceeds to Step 421a. When neither of the filler lid opening detection switch 105a nor the filler lid open command switch 104 is closed, a determination of NO is made and the flow proceeds to step 421c.

After the self-hold command output DR1 is generated in Step 421a, the flow proceeds to Step 421b. After starting of refuel processing is memorized in Step 421b, the flow proceeds to Step 422. In Step 422, timekeeping by the cut-off timer 422 is started to check whether a time since the self-hold command output DR1 is generated in Step 421a has reached the cut-off threshold time T1, which is a maximum generation period. Thereafter, the flow proceeds to Step 423a.

Step 421c is a determination step in which it is determined whether starting of refuel processing is memorized in Step 421b. When refuel processing is being performed, a determination of YES is made and the flow proceeds to Step 423a. When refuel processing is not being performed, a determination of NO is made and the flow proceeds to Step 530 of FIG. 5 described below via a relay terminal B. Once the refuel processing is started by the filler lid open command switch 104, Step 423a and subsequent steps are performed even when the filler lid open command switch 104 is opened.

Step 423a is a determination step in which it is determined whether the time is up for the cut-off timer 422 started in Step 422. When the predetermined cut-off threshold time T1 has not elapsed, a determination of NO is made and the flow proceeds to Step 424a. When the time is up, a determination of YES is made and the flow proceeds to Step 423b.

In Step 423b, driving of the opening inhibiting alarm 76 driven in Step 424b is stopped, the sealing valve opening solenoid valve 72 driven in Step 425b or Step 425c is de-energized and sealed, and the decompression pump 75 driven in Step 425b is stopped. Also, after the filler opening actuator 71 driven in Step 426b is stopped and the memory of starting of refuel processing memorized in Step 421b is cancelled, the flow proceeds to Step Block 311 of FIG. 3 via the relay terminal C. When the memory of starting of refuel processing is cancelled, a determination of NO is made in Step 421c.

Step 424a is a determination step in which it is determined whether the filler lid opening detection switch 105a is already closed by monitoring the filler opening detection signal FODL. When the filler lid opening detection switch 105a is already closed, a determination of YES is made and the flow proceeds to Step 424b. When the filler lid opening detection switch 105a is not closed yet, a determination of NO is made and the flow proceeds to Step 425a. After the opening inhibition alarm 76 of the filler cap 202, which is, for example, an LED indicator provided in the vicinity of the filler neck, is driven to blink in Step 424b, the flow proceeds to Step 425a.

Step 425a is a determination step in which it is determined whether a detection output of the tank pressure sensor 61 provided in the fuel tank 200 has dropped within a predetermined threshold range in the vicinity of the atmospheric pressure. When discharging of air to the atmosphere is not completed, a determination of NO is made and the flow proceeds to Step 425b. When discharging of air to the atmosphere is completed, a determination of YES is made and the flow proceeds to Step 425c.

After the bypass channel bringing the fuel tank 200 and the canister 210 into communication is opened by feeding and energizing the sealing valve opening solenoid valve 72 and the decompression pump 75 is driven in Step 425b, the flow proceeds to operation ending Step 310. It should be noted, however, that the decompression pump 75 is not driven when a refueling operation is started while a leakage detection of the fuel tank 200 is performed and the internal pressure of the fuel tank 200 is a negative pressure. The internal pressure of the fuel tank 200 may be decreased quickly by driving the decompression pump 75. However, the decompression pump 75 is not necessarily driven. In particular, in a case where the filler opening actuator 71 is provided and the filler lid 203 is configured in such a manner that the filler lid 203 is not opened until decompression is completed, driving of the decompression pump 75 can be omitted.

When the flow proceeds to operation ending Step 310, a circulation loop from Step 301 and Step 302a of FIG. 3 via the relay terminal A to Step 420, Step 421c, Step 423a, Step 424a, Step 425a, and Step 425b of FIG. 4, and to Step 310 is formed. As the internal pressure of the fuel tank 200 drops in due time, a determination of YES is made in Step 425a and the flow escapes from the circulation loop. When a determination of YES is made in Step 423a before the internal pressure drops, the flow escapes from the circulation loop and proceeds to Step Block 311 of FIG. 3.

In Step 425c performed when the internal pressure of the fuel tank 200 drops, the sealing valve opening solenoid valve is de-energized or energized continuously and the decompression pump 75 is stopped. Thereafter, the flow proceeds to Step 426a. The sealing valve opening solenoid valve 72 may be de-energized and sealed after the internal pressure of the fuel tank 200 drops once. However, because there may be a case where the fuel cap 202 is opened with a delay because a refueling operation is started with a delay, it is preferable to keep nothing but the sealing valve opening solenoid valve 72 energized and opened.

Step 426a is a determination step in which it is determined whether the filler lid opening detection switch 105a is already closed by monitoring the filler opening detection signal FODL in the same manner as in Step 424a. When the filler lid opening detection switch 105a is already closed, a determination of YES is made and the flow proceeds to Step 426c. When the filler lid opening detection switch 105a is not closed yet, a determination of NO is made and the flow proceeds to Step 426b.

After the filler opening actuator 71 is driven in Step 426b, the flow proceeds to operation ending Step 310. When the flow proceeds to operation ending Step 310, a circulation loop from Step 301 and Step 302a of FIG. 3 via the relay terminal A to Step 420, Step 421c, Step 423a, Step 424a, Step 425a, Step 425c, Step 426a, and Step 426b of FIG. 4 to Step 310 is formed. When the filler lid 203 is opened in due time, a determination of YES is made in Step 426a and the flow escapes from the circulation loop and proceeds to Step 426c. When a determination of YES is made in Step 423a before the filler lid 203 is opened, the flow escapes from the circulation loop and proceeds to Step Block 311 of FIG. 3.

After an opening permission is notified in Step 426c by stopping the driving of the opening inhibition alarm 76 of the filler cap 202 driven in Step 424b, the flow proceeds to Step 427a. In Step 427a, a series of manual operations including manually opening the filler cap 202, performing a refuel operation, and closing the filler cap 202 and the filler lid 203 upon completion of refueling, is performed. As a control operation by the microprocessor 10, a determination of YES is made in Step 426a or the flow immediately proceeds to Step 427b following Step 426c.

Step 427b is a determination step in which it is determined whether the filler lid closing detection switch 105b is closed by monitoring the filler closing detection signal FCDH. When the filler lid closing detection switch 105b is closed, a determination of YES is made and the flow proceeds to Step 428. When the filler lid closing detection switch 105b is not closed, a determination of NO is made and the flow proceeds to operation ending Step 310.

When the flow proceeds to operation ending Step 310, a circulation loop from Step 301 and Step 302a of FIG. 3 via the relay terminal A to Step 420, Step 421c, Step 423a, Step 424a, Step 425a, Step 425c, Step 426a, Step 426c, and Step 427b of FIG. 4 to Step 310 is formed. When the filler lid 203 is closed in due time, a determination of YES is made in Step 427b and the flow escapes from the circulation loop and proceeds to Step 428. When a determination of YES is made in Step 423a before the filler lid 203 is closed, the flow escapes from the circulation loop and proceeds to Step Block 311 of FIG. 3. Closing of the filler lid 203 can be detected by determining whether the filler lid opening detection switch 105a is opened. However, in order to determine whether it is sure that filler lid 203 is closed, it is preferable to use the filler lid closing detection switch 105b that is closed when the filler lid 203 is closed.

After the shutdown command SHD for the timed energizing circuit 119A is issued in Step 428, the flow proceeds to Step 429a. After the sealing valve opening solenoid valve 72 energized in Step 425c is de-energized and sealed in Step 429a, the flow proceeds to Step 429b. After the memory of starting of refuel processing memorized in Step 421b is cancelled in Step 429b, the flow proceeds to operation ending Step 310. When the memory of the starting of refuel processing is cancelled, a determination of NO is made in Step 421c.

When the flow proceeds to operation ending Step 310 by way of Step 429b upon completion of refueling, the microprocessor 10 runs another control program. After a predetermined repetition time, operation starting Step 301 of FIG. 3 is activated. When the power supply switch 103 is opened and the filler lid open command switch 104 and the filler lid opening detection switch 105a are opened in this instance, a determination made in Step 302a of FIG. 3 is NO. Determinations made in subsequent Step 420 and Step 421c of FIG. 4 are also NO. Hence, the flow proceeds to Step 530 of FIG. 5 via the relay terminal 3. Step 428 can be provided at any point after Step 421a and before a determination of YES is made in Step 423a. The point is that it is only necessary to drive the timed energizing circuit 119A during an arbitrary period since the power supply relay 102 started a self-hold operation until the self-hold operation is cancelled by the cut-off timer 422.

In the case of a second embodiment described below with reference to FIG. 7, a timed energizing circuit 119B is used so that there is no need to issue the shutdown command SHD in Step 428.

Step Block 111c made up of a series of Step 420 through Step 429b corresponds to a decompression processing portion and Step 422 represents a starting step of the cut-off timer 422.

Figure 5:
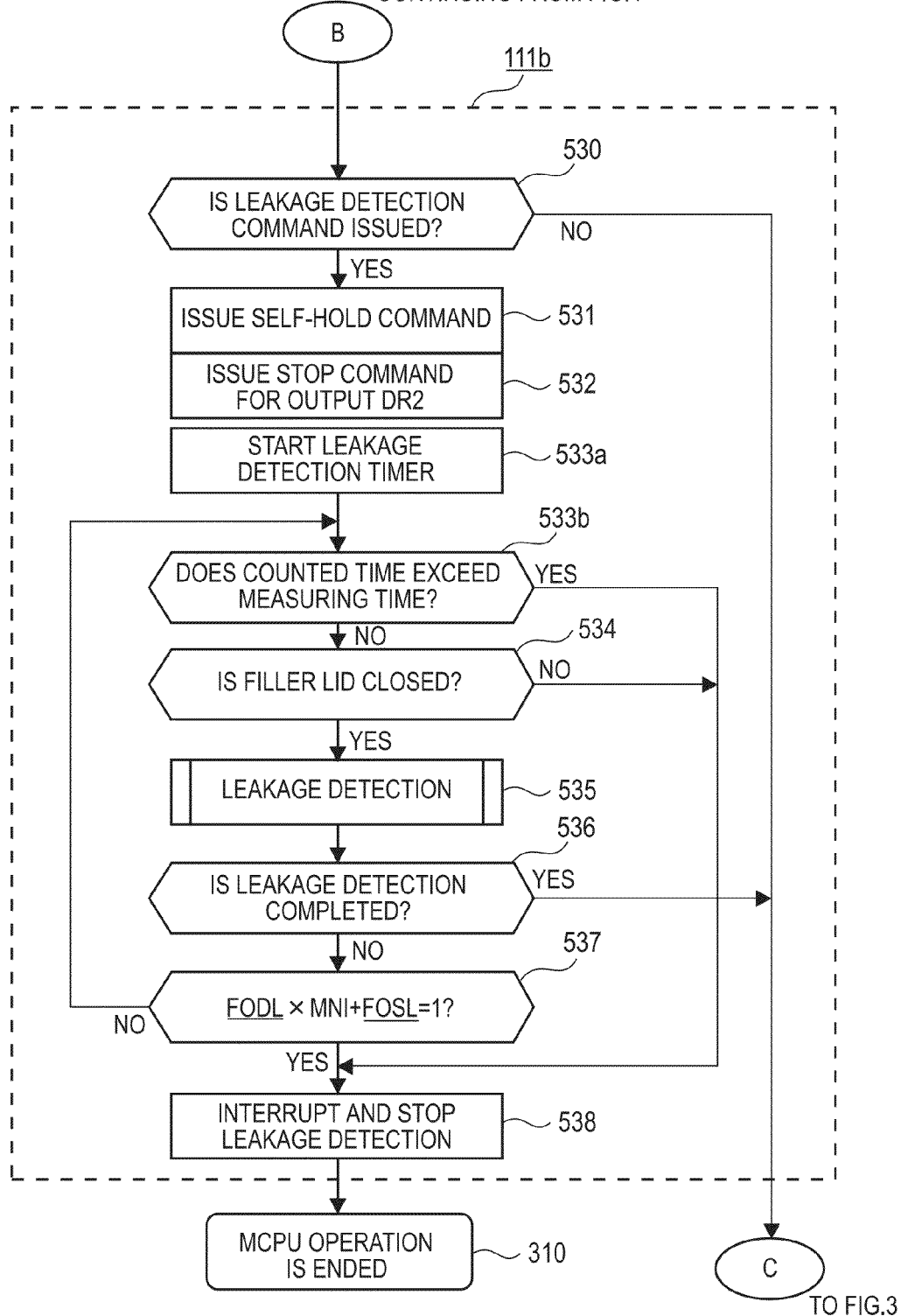
FIG. 5 is still another flowchart depicting the operation of the in-vehicle control unit according to the first embodiment of the invention.

Referring to FIG. 5, in a case where the microprocessor 10 is operating even when the power supply switch 103 is opened and the filler lid open command switch 104 and the filler lid opening detection switch 105a are opened, Step 530 is performed.

In Step 530, it is determined whether a leakage detection command is received from the sub-control circuit portion 120A. When the leakage detection command is received, a determination of YES is made and the flow proceeds to Step 531. When the leakage detection command is not received, a determination of NO is made and the flow proceeds to Step Block 311 of FIG. 3 via the relay terminal C.

After the self-hold command output DR1 is generated in Step 531, the flow proceeds to Step 532. After a stop command for the waking command signal output DR2 is sent in Step 532, the flow proceeds to Step 533a. After a monitoring timer for a leakage detection time Tb comparable to a normal time since a start until a completion of a leakage detection is started in Step 533a, the flow proceeds to Step 533b.

Step 533b is a determination step in which it is determined whether an elapsed time counted by the monitoring timer started in Step 533a has exceeded a predetermined measuring time. When the elapsed time has exceeded the predetermined measuring time, a determination of YES is made and the flow proceeds to Step 538. When the elapsed time has not exceeded the predetermined measuring time, a determination of NO is made and the flow proceeds to Step 534.

Step 534 is a determination step in which it is determined whether the filler lid 203 is closed by monitoring the filler closing detection signal FCDH. When the filler lid 203 is closed, a determination of YES is made and then the flow proceeds to Step Block 535. When the filler lid 203 is not closed, a determination of NO is made and then the flow proceeds to Step 538.

Figure 6:
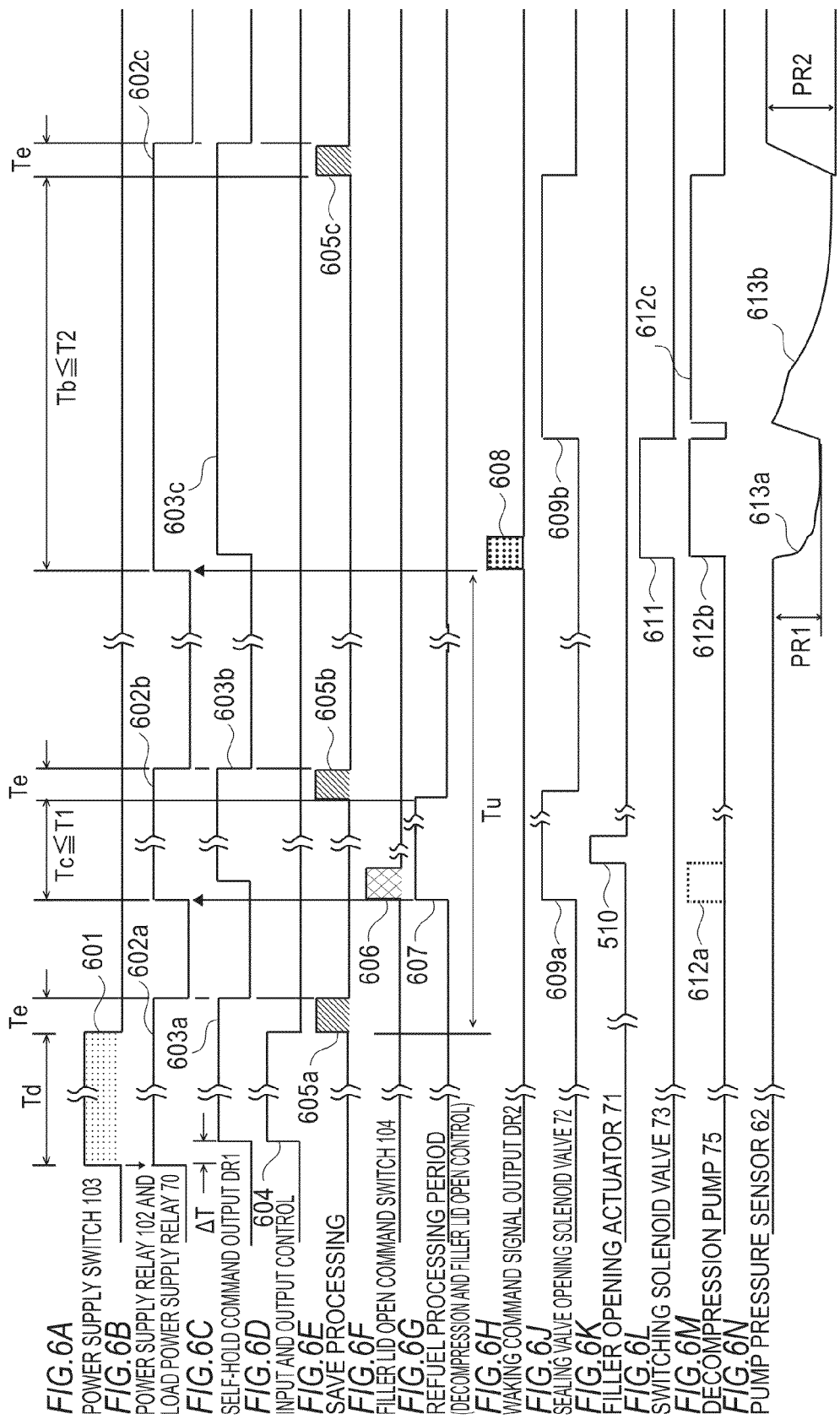
FIGS. 6A through 6H and 6J through 6N are time charts depicting an overall operation of the in-vehicle electronic control unit according to the first embodiment of the invention.

Step Block 535 is a leakage detection step in which airtightness of the fuel tank 200 is checked, which will be described specifically below with reference to FIG. 6.

Subsequent Step 536 is a determination step activated periodically in the course of performing Step Block 535, in which it is determined whether the leakage detection is completed.

When the leakage detection is completed, a determination of YES is made and the flow proceeds to Step Block 311 of FIG. 3 via the relay terminal C. When the leakage detection is not completed, a determination of NO is made and the flow proceeds to Step 537.

Step 537 is a determination step in which it is determined whether the filler lid opening detection switch 105a is closed and the logic level of the monitor signal MNI is "H" or it is determined whether the filler lid open command switch 104 is closed in the same manner as in Step 420 of FIG. 4 by monitoring the filler open command signal FOSL, the filler opening detection signal FODL, and the monitor signal MNI. When at least either the filler lid opening detection switch 105a or the filler lid open command switch 104 is closed, a determination of YES is made and the flow proceeds to Step 538. When neither the filler lid opening detection switch 105a nor the filler lid open command switch 104 is closed, a determination of NO is made, and the flow returns to Step 533b.

In Step 538, the driving of the decompression pump 75 is stopped, the driving of the switching solenoid valve 73 is stopped, and the sealing valve opening solenoid valve 72 is de-energized and sealed by interrupting and stopping the leakage detection in Step Block 535. Thereafter, the flow proceeds to operation ending Step 310.

In a case where operation starting Step 301 of FIG. 3 is activated after the leakage detection is interrupted, the flow proceeds from Step 302a of FIG. 3 to Step 420 of FIG. 4. As a determination of YES is made in Step 420, the decompression processing portion 111c is run. The flow proceeds again to Step 530 of FIG. 5 upon completion of the decompression processing and the leakage detection is resumed.

The flows of FIG. 4 and FIG. 5 proceed to Step Block 311 of FIG. 3 via the relay terminal C in cases where the decompression processing is forcedly completed because the time has expired (a determination made in Step 423a is YES), where the leakage detection command is not issued (a determination made in Step 530 is NO), or where the leakage detection is normally completed (a determination in Step 536 is YES). In any case, both the decompression processing and the leakage detection can no longer be continued or are completed normally. In such a case, an abnormality history is saved in Step Block 311 of FIG. 3, and after the following waking hours are set in Step 313, the self-hold command output DR1 is cancelled and the microprocessor 10 is stopped in Step 314. In Step 425a of FIG. 4, it is determined whether the internal pressure of the fuel tank 200 drops to or below the predetermined value by the tank pressure sensor 61. In the case of a vehicle having no tank pressure sensor 61, by measuring an elapsed time since the decompression processing is started in Step 425b, it becomes possible to estimate a drop of the internal pressure of the fuel tank 200 to or below the predetermined value on the ground that the elapsed time exceeds a predetermined time.

A description will now be given to FIGS. 6A through 6H and 6J through 6N, which are time charts schematically showing an overall operation depicted by the flowcharts of FIG. 3 through FIG. 5.

Referring to FIG. 6A, a FIG. 601 represents a period during which the power supply switch 103 is closed and this closing period is referred to as a vehicle operation time Td.

FIG. 6B shows a period during which the power supply relay 102 and the load power supply relay 70 are energized. A FIG. 602a represents a period during which the power supply relay 102 and the load power supply relay 70 are energized as the power supply switch 103 is closed. A FIG. 602b represents a period during which the power supply relay 102 and the load power supply relay 70 are energized as the filler lid open command switch 104 shown in FIG. 6F is closed. A FIG. 602c represents a period during which the power supply relay 102 and the load power supply relay 70 are energized as the waking command signal output DR2 shown in FIG. 6H is generated.

FIG. 6C shows a state of the self-hold command output DR1 generated after a response delay time ΔT when the microprocessor 10 starts to operate as the power supply relay 102 is energized as shown in FIG. 6B. FIGS. 603a, 603b, and 603c corresponding, respectively, to the FIGS. 602a, 602b, 602c of FIG. 6B represent output generation periods. The response delay time ΔT is a time, for example, as short as or shorter than 0.1 sec and the microprocessor 10 performs initialization processing of the RAM memory 12 within this time.

Referring to FIG. 6D, a FIG. 604 represents a period during which the input and output control portion 111a of FIG. 3 is run. This is a period since the microprocessor 10 started to operate until the power supply switch 103 is opened.

FIG. 6E shows a period during which the save processing portion 111d of FIG. 3 is run. A save processing time Te is a time, for example, as short as or shorter than 0.1 sec. Upon completion of the save processing, the self-hold command output DR1 shown in FIG. 6C is cancelled and the power supply relay 102 and the load power supply relay 70 shown in FIG. 63 are de-energized. A FIG. 605a represents a save processing period corresponding to opening of the power supply switch 103 shown in FIG. 6A. A FIG. 605b represents a save processing period upon completion of refuel processing described below with reference to FIG. 6G. A FIG. 605c represents a save processing period upon completion of a leakage detection made up of a series of steps shown in FIG. 6H through FIG. 6N.

Referring to FIG. 6F, a FIG. 606 represents a period during which the filler lid open command switch 104 is closed.

Referring to FIG. 6G, a FIG. 607 represents a refuel processing period Tc during which the decompression processing portion 111c of FIG. 4 is run because the filler lid open command switch 104 is closed in response to the FIG. 606. In this refuel processing period Tc, the sealing valve opening solenoid valve 72 is energized and opened as represented by a FIG. 609a of FIG. 6J described below, decompression processing of the fuel tank 200 is performed by driving the decompression pump 75 as represented by a FIG. 612a of FIG. 6M described below, the filler opening actuator 71 is driven as represented by a FIG. 510 of FIG. 6K described below, the filler cap 202 is manually opened, fuel is supplied manually, and the filler cap 202 and the filler lid 203 are manually closed. In a case where a refueling operation is delayed or the filler cap 202 or the filler lid 203 is left open, running of the decompression processing portion 111c is completed within a limit of the predetermined cut-off threshold time T1 and the save processing portion 111d represented by the FIG. 605b is run upon completion of the refuel processing period Tc.

Referring to FIG. 6H, a FIG. 608 represents generation of the waking command signal output DR2 because the power supply switch 103 is opened in response to the FIG. 601 and the predetermined waking hours Tu have elapsed. Thereafter, the leakage detection control portion 111b of FIG. 5 is run. It should be noted, however, that the leakage detection time Tb between the FIG. 608 and the FIG. 605c is limited to a detection upper limit time T2.

FIG. 6J shows a driving state of the sealing valve opening solenoid valve 72. The FIG. 609a corresponds to the refuel processing period Tc and a FIG. 609b represents a driving period within the leakage detection time Tb described below.

Referring to FIG. 6K, the FIG. 510 represents a driving period of the filler opening actuator 71 within the refuel processing period Tc described above.

Referring to FIG. 6L, a FIG. 611 represents a period during which the switching solenoid valve 73 is driven to switch the air discharge channel of FIG. 2 to the side of the orifice 220.

Referring to FIG. 6M, a FIG. 612a represents a driving period of the decompression pump 75 corresponding to the FIG. 606 described above. A FIG. 612b represents a driving period of the decompression pump 75 corresponding to the FIG. 611. A FIG. 612c represents a driving period of the decompression pump 75 after the driving of the switching solenoid valve 73 represented by the FIG. 611 is cancelled and the air discharge channel of FIG. 2 is switched to the side of the canister 210.

FIG. 6N shows a waveform of a negative pressure detected by the pump pressure sensor 62 installed in the air discharge channel of FIG. 2. A waveform 613a corresponding to the FIG. 611 and the FIG. 612b indicates a pressure change in the air discharge channel in a case where the switching solenoid valve 73 is driven and air is sucked in from the orifice 220. A pressure drops with time and eventually converges to a value of a first saturated negative pressure PR1.

The microprocessor 10 memorizes the value of the first saturated negative pressure PR1 and de-energizes the switching solenoid valve 73. The microprocessor 10 then energizes and opens the sealing valve opening solenoid valve 72 as represented by the FIG. 609b of FIG. 6J and continuously drives the decompression pump 75 as represented by the FIG. 612c so that air is sucked in from the fuel tank 200 via the canister 210. Consequently, as is indicated by the waveform 613a, a detected output in the pump pressure sensor 62 rises first and then drops and converges to a second saturated negative pressure PR2.

The microprocessor 10 reads out the value of the second saturated negative pressure PR2 and then stops the driving of the decompression pump 75 and the sealing valve opening solenoid valve 72. The microprocessor 10 also determines that the fuel tank 200 is normal when the second saturated negative pressure PR2 is a negative pressure larger than the first saturated negative pressure PR1 in absolute value and that the leakage narrow mouth is larger than the reference value when the former is a negative pressure smaller than the latter in absolute value, and then memorizes and saves the determination result by performing the save processing represented by the FIG. 605c.

As has been described in detail, the in-vehicle electronic control unit of the first embodiment is the in-vehicle electronic control unit 100A including the microprocessor 10 and fed via the output contact 102a in the power supply relay 102 that is directly energized from the in-vehicle battery 101 as the power supply switch 103 for vehicle operation is closed even when the microprocessor 10 is not operating. The microprocessor 10 controls the in-vehicle electrical load group 107 including at least the fuel injection solenoid valves 77 under control in response to an operation state of the in-vehicle sensor group 106. The program memory 11A operating in cooperation with the microprocessor 10 pre-stores a control program realizing the decompression portion 111c including the cut-off timer 422 in addition to a control program realizing the input and output control portion 111a for vehicle operation.

The power supply relay 102 is directly energized even in a vehicle stop state in which the power supply switch 103 is not closed when at least one of the filler lid open command switch 104 and the filler lid opening detection switch 105a as an alternative to the power supply switch 103 is closed. The power supply relay 102 is operated under timed energization so as not be energized when the filler lid opening detection switch 105a remains in a closed state for more than the predetermined limit period T0. Also, the power supply relay 102 is operated under self-hold energization by the self-hold command output DR1 generated because the microprocessor 10 is operating normally when the power supply relay 102 is directly energized and the microprocessor 10 starts to operate.

The filler lid opening detection switch 105a is a switch that is closed when the filler lid 203 as a safety door provided on the outer surface of the filler cap 202 closing an opening end of the fuel pipe 201 communicating with the fuel tank 200 is fully or half opened by the filler opening actuator 71 or a manual operation and the filler cap 202 is manually openable and closable.

The filler opening actuator 71 is a motor or an electromagnet that fully or half opens the filler lid 203 or brings the filler lid 203 in a half opened state by cancelling a closed and locked state thereof. The decompression processing portion 111c discharges an internal pressure of the fuel tank 200 to the atmosphere via the canister 210 adsorbing evaporated fuel by energizing and opening the sealing valve opening solenoid valve 72 provided between the fuel tank 200 and the canister 210 at least once when the filler lid open command switch 104 or the filler lid opening detection switch 105a is closed. After an elapse of a predetermined time or upon detection that the internal pressure of the fuel tank 200 detected by the tank pressure sensor 61 as a part of the in-vehicle sensor group 106 drops within a predetermined threshold range in the vicinity of atmospheric pressure, the decompression processing portion 111c drives the filler opening actuator 71 to open the filler lid 203 in a case where the filler opening actuator 71 is provided. Thereafter, decompression processing portion 111c stops the self-hold command output DR1 because the filler cap 202 and the filler lid 203 are closed manually upon completion of refueling and the sealing valve opening solenoid valve 72 is de-energized and sealed or de-energizes and seals the sealing valve opening solenoid valve 72 because the self-hold command output DR1 stops.

The cut-off timer 422 stops the self-hold command output DR1 when the filler lid 203 is not closed even after an elapse of the predetermined cut-off threshold time T1 since the filler lid open command switch 104 or the filler lid opening detection switch 105a is closed.

The decompression processing portion 111c discharges an internal pressure of the fuel tank 200 to the atmosphere via the canister 210 adsorbing evaporated fuel by energizing and opening the sealing valve opening solenoid valve 72 provided between the fuel tank 200 and the canister 210 at least once when the filler lid open command switch 104 or the filler lid opening detection switch 105a is closed. After an elapse of the predetermined time or upon detection that an internal pressure of the fuel tank 200 detected by the tank pressure sensor 61 as a part of the in-vehicle sensor group 106 drops within the predetermined threshold range in the vicinity of the atmospheric pressure, in a case where the filler lid 203 is of a manual open type, the decompression processing portion 111c drives an opening permission alarm of the filler lid 203 or stops the driving of the opening inhibition alarm 76 driven upon energization and opening of the sealing valve opening solenoid valve 72.

As has been described, in a case where the filler opening actuator 71 is not used, the opening inhibition alarm 76 of the filler cap 202 is operated since the filler lid 203 is manually opened until the decompression processing of the fuel tank 200 is completed or the opening permission alarm of the filler cap 202 is operated after the decompression processing is completed.

Accordingly, even when an abnormality occurs in the filler opening actuator 71 and it becomes impossible to open the filler lid 203 or in a case where the filler opening actuator 71 is not provided from the start, it becomes possible to prevent evaporated fuel from flowing out of the fuel tank 200 when the filler cap 202 is opened.

The filler lid opening detection switch 105a is closed when the filler lid 203 is manually openable in a half or more opened state as the closed and locked state is cancelled by the filler opening actuator 71 or a manual operation. The power supply relay 102 is directly energized within the predetermined limit period T0 as the filler lid opening detection switch 105a is closed. When the filler lid opening detection switch 105a is closed, the microprocessor 10 continues to energize and open the sealing valve opening solenoid valve 72 at least once until the internal pressure of the fuel tank 200 drops within the predetermined threshold range in the vicinity of the atmospheric pressure. The predetermined limit period T0 is equal to or longer than a response delay time ΔT since the power supply relay 102 is energized until the microprocessor 10 starts to operate normally and equal to or shorter than the predetermined cut-off threshold time T1 that is a set time in the cut-off timer 422.

In this manner, the power supply relay 102 is directly energized in the predetermined limit period T0 in response to the closing of the filler lid opening detection switch 105a and the microprocessor 10 at least energizes and opens or de-energizes and seals the sealing valve opening solenoid valve 72.

Accordingly, in a case where the filler lid 203 is left open, even when the filler lid opening detection switch 105a is kept closed, the energizing circuit in the power supply relay 102 directly becomes invalid after the predetermined limit period T0, so that the power supply relay 102 is de-energized as the self-hold command output DR1 is cancelled within the predetermined cut-off threshold time T1. Hence, the sealing valve opening solenoid valve 72 is de-energized and closed.

The exciting coil 102b in the power supply relay 102 is driven when fed from the in-vehicle battery 101 via the energizing transistor 118a. Conduction drive signals are supplied to the energizing transistor 118a from each of the power supply switch 103, the filler lid open command switch 104, the filler lid opening detection switch 105a, and the self-hold command output DR1 via the drive resistors 113c, 114c, 115c, and 118c and the series diodes 113d, 114d, 115d, and 118d, respectively.

The timed energizing circuit 119A is fed when the filler lid opening detection switch 105a is closed. The timed energizing circuit 119A memorizes issuance of the shutdown command SHD outputted from the microprocessor 10 at arbitrary timing within the predetermined limit period T0 using the latch circuit formed of the first and second transistors 90a and 91a, and cut offs a conduction drive signal to the energizing transistor 118a via the drive resistor 115c and the series diode 115d connected to the filler lid opening detection switch 105a using the third transistor 92a. The latch circuit formed of the first and second transistors 90a and 91a is reset when the filler lid opening detection switch 105a is opened.

In this manner, in a case where the power supply relay 102 is energized in response to the closing of the filler lid opening detection switch 105a, the timed energizing circuit 119A starts to operate after an elapse of the predetermined limit period T0 and directly cuts off the energizing circuit in the power supply relay 102 operated in response to the filler lid opening detection switch 105a.

Hence, when the filler lid 203 is left open, the energizing circuit in the power supply relay 102 becomes invalid and the power supply relay 102 is de-energized within the predetermined cut-off threshold time T1. Accordingly, even when the filler lid opening detection switch 105a is kept closed, the power supply relay 102 is not energized again. Once the filler lid opening detection switch 105a is opened and feeding to the timed energizing circuit 119A is stopped, the timed energizing circuit 119A restores to an initial state.

Second Embodiment

Figure 7:
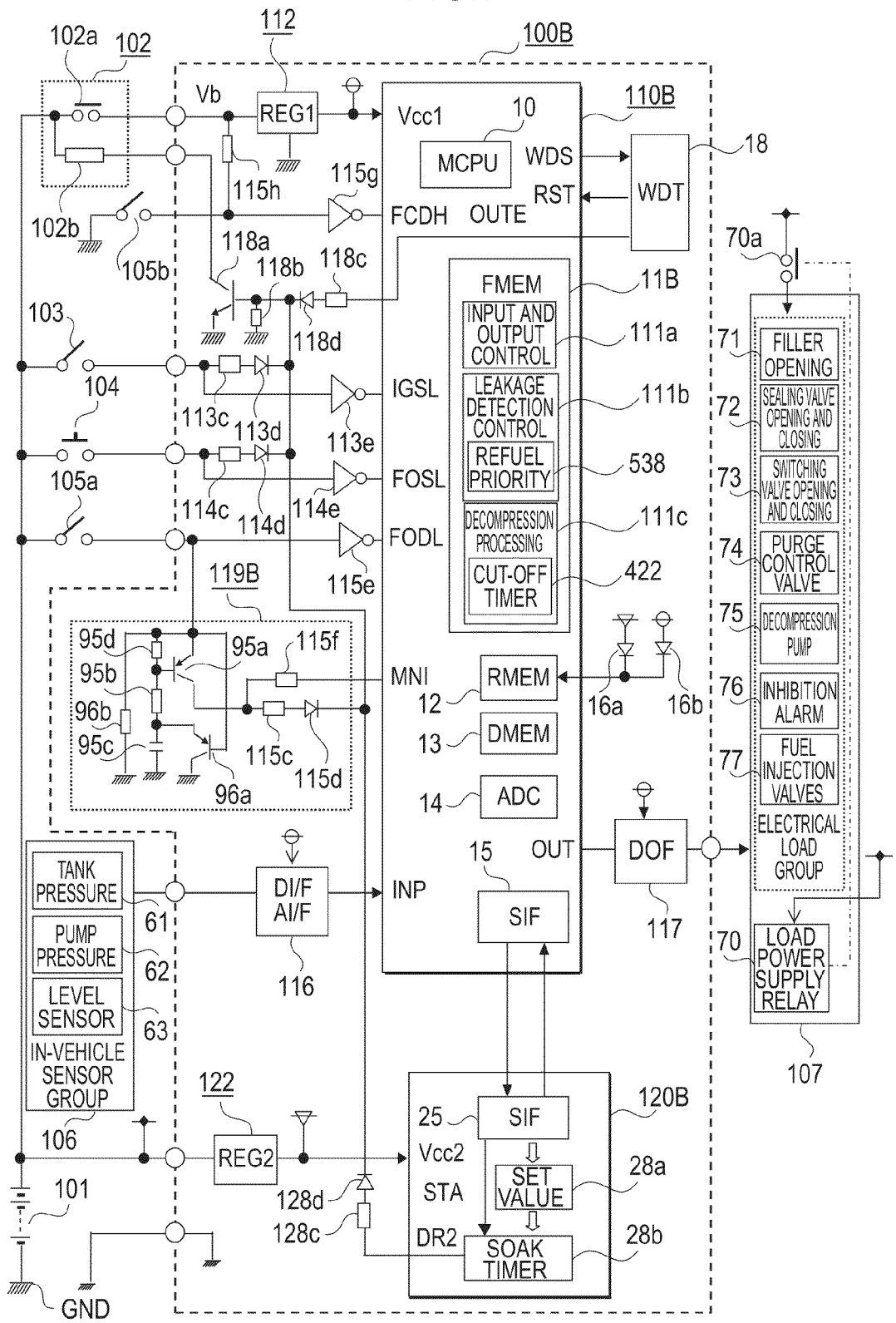
FIG. 7 is an overall circuit block diagram of an in-vehicle electronic control unit according to a second embodiment of the invention.

A description will now be given to FIG. 7 showing an overall circuit block diagram of an in-vehicle electronic control unit according to a second embodiment of the invention, and a difference from the first embodiment described above with reference to FIG. 1 will be chiefly described. Reference numerals of FIG. 7 same as those of FIG. 1 denote the same or equivalent portions.

Referring to FIG. 7, as in FIG. 1, an in-vehicle battery 101, a power supply relay 102, a power supply switch 103, a filler lid open command switch 104, a filler lid opening detection switch 105a, a filler lid closing detection switch 105b, an in-vehicle sensor group 106, and an in-vehicle electrical load group 107 are connected to the outer portion of an in-vehicle electronic control unit 100B.

As in FIG. 1, a main control circuit portion 110B fed from a main power supply circuit 112 and a sub-control circuit portion 120B constantly fed from a sub-power supply circuit 122 are provided inside the in-vehicle electronic control unit 100B. A a drive circuit of an energizing transistor 118a that energizes the power supply relay 102, an input interface circuit 116, and an output interface circuit 117 are also provided in the same manner. It should be noted, however, that an output enabling signal OUTE generated by a watchdog timer 18 is used as the self-hold command output instead of the self-hold command output DR1 generated by the microprocessor 10, and a base current of the energizing transistor 118a is supplied via a drive resistor 118c and a series diode 118d.

As with the counterpart of FIG. 1, the main control circuit portion 1103 is formed by interconnecting a microprocessor 10, a program memory 113, a RAM memory 12, a data memory 13, a multi-channel A-to-D converter 14, and a serial parallel converter 15 via buses. The program memory 11B pre-stores control programs realizing the input output control portion 111a, the leakage detection control portion 111b including the refuel priority portion 538, the decompression processing portion 111c including the cut-off timer 422, and the unillustrated save processing portion of the first embodiment above described with reference to FIG. 3 through FIG. 5.

The microprocessor 10 generates a watchdog signal WDS, which is a pulse train signal with a pulse interval equal to or less than a predetermined value. The watchdog timer 18 monitors a pulse width of the watchdog signal WDS and shifts the logic level of the output enabling signal OUTE to "H" when the pulse width is equal to or narrower than a predetermined cycle and shifts the logic level of the output enabling signal OUTE to "L" when the pulse width exceeds the predetermined cycle. Also, the watchdog timer 18 generates a reset signal RST and initializes and starts the microprocessor 10 again.

A timed energizing circuit 119B is formed of a cut-off transistor 95a, which is a PNP transistor connected in series between a filler lid opening detection switch 105a and a drive resistor 115c, a charge resistor 95b and a capacitor 95c connected in series to a base terminal of the cut-off transistor 95a, an opening stabilizing resistor 95d connected between an emitter terminal and a base terminal of the cut-off transistor 95a, a discharge transistor 96a connected in parallel to the capacitor 95c and rapidly discharging charges charged in the capacitor 95c, a base resistor 96b in which a base current of the discharge transistor 96a is flown when the filler lid opening detection switch 105a is opened, and a series diode 115d connected between the drive resistor 115c and a base terminal of the energizing transistor 118a that energizes the power supply relay 102. A signal from a collector terminal of the cut-off transistor 95a is inputted as a monitor signal MNI of the microprocessor 10 via a monitor circuit resistor 115f and an unillustrated voltage-dividing resistor.

A filler lid opening and closing mechanism forming input and output peripheral devices of FIG. 7 will now be described in detail with reference to FIG. 8.

Figure 8:
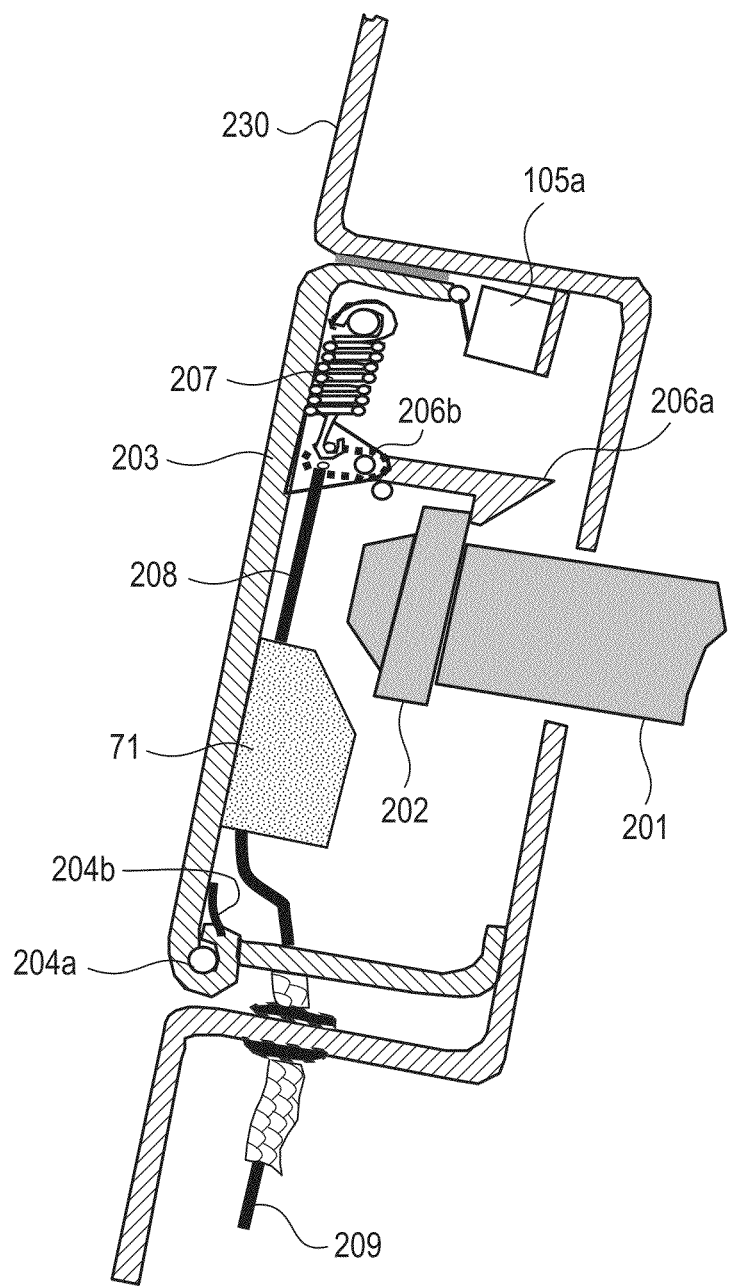
FIG. 8 is a view schematically showing a configuration of peripheral devices of the in-vehicle electronic control unit according to the second embodiment of the invention.

Referring to FIG. 8, a filler neck as an opening end of a fuel pipe 201 protrudes from an armored plate member 230 of the vehicle body and is closed with a filler cap 202. A filler lid 203 is axially supported to be pivotal at one end by a lid spindle 204a fixed to the armored plate member 230 and energized to pivot in an opening direction by an accumulator spring 204b wound around the lid spindle 204a.

A hook lever 206a is axially supported to be pivotal about a lever spindle 206b fixed to the inner surface of the filler lid 203. One end thereof is engaged with an outer circumference portion of the filler cap 202 and the other end is driven to pivot by a closing spring 207. Accordingly, a hook of the hook lever 206a is engaged with the outer circumference portion of the filler cap 202.

The other end of the hook lever 206a is connected to a filler opening actuator 71 and an opening wire 209 via an opening rod 208, and the hook is released by turning the hook lever 206a against the closing spring 207 using the filler opening actuator 71 or the opening wire 209, so that the filler lid 203 is opened by the accumulator spring 204b. The filler lid opening detection switch 105a is a switch that is closed when the filler lid 203 is in a half or fully opened state as a closed and locked state of the filler lid 203 is cancelled by the filler opening actuator 71 or a manual operation.

Hereinafter, a function and an operation of the in-vehicle electronic control unit of the second embodiment configured as in FIG. 7 will be described and a difference from the first embodiment described above with reference to FIG. 1 will be chiefly described. A function and an operation are the same as those depicted by the flowcharts shown in FIGS. 3 through 5 and the time charts shown in FIGS. 6A through 6H and 6J through 6N except for a part of operation described below.

A brief description will be given to FIG. 7 and FIG. 8. When the power supply switch 103 is closed to operate the vehicle, a base current of the energizing transistor 118a is supplied via the drive resistor 113c and the series diode 113d and the energizing transistor 118a starts conducting. Accordingly, the exciting coil 102b in the power supply relay 102 is energized and the output contact 102a in the power supply relay 102 is closed. Then, the main power supply circuit 112 in the in-vehicle electronic control unit 100B is fed. A main control power supply voltage Vcc1 is thus applied to the main control circuit portion 110B and the microprocessor 10 starts to operate. Hence, the in-vehicle electrical load group 107, for example, fuel injection solenoid valves, sparking coils, or a throttle valve angle control motor, is driven under control in response to an operation state of the in-vehicle sensor group 106 and the content of a control program pre-stored in the program memory 11B and realizing the input output control portion 111a.

Once the microprocessor 10 starts to operate, the output enabling signal OUTE generated by the watchdog timer 18 because the microprocessor 10 is operating normally serves as a self-hold command output OUTE. Hence, a base current of the energizing transistor 118a is supplied via the drive resistor 118c and the series diode 118d and the power supply relay 102 is operated under self-hold energization by the microprocessor 10.

When the power supply switch 103 is opened as the vehicle is stopped, the power supply relay 102 is continuously energized by the self-hold command output OUTE and the microprocessor 10 is therefore continuously fed. In this continuous feeding period, the control program realizing the save processing portion is run. By running this control program, the self-hold command output CUTE is cancelled by stopping the watchdog signal WDS so that the power supply relay 102 is de-energized and the output contact 102a is opened only after a completion of processing such as to transfer and save learning information and abnormality occurrence information acquired and stored in a RAM memory 12 while the vehicle is in motion into a non-volatile data memory 13 and to send a timekeeping start command signal STA to a soak timer 28b. This continuous feeding period is a time, for example, as short as or shorter than 0.1 sec. In contrast, the soak timer 28b generates a waking command signal output DR2 at the timing when the engine is cooled sufficiently, for example, five hours later since the timekeeping start command signal STA is received or the microprocessor 10 stops operating.

In a parked state in which the power supply switch 103 is opened, when the filler lid open command switch 104 or the filler lid opening detection switch 105a is closed, the power supply relay 102 is energized as a base current of the energizing transistor 118a is supplied via the drive resistors 114c and 115c and the series diodes 114d and 115d. Then, the microprocessor 10 is started and generates the self-hold command output CUTE and runs the control program realizing the decompression processing portion 111c described above. Then, the watchdog signal WDS is stopped when the filler lid 203 is closed manually upon completion of refueling or a predetermined cut-off threshold time T1, for example, 20 min, has elapsed. The self-hold command output CUTE is thus cancelled and the power supply relay 102 is de-energized.

It should be appreciated, however, that when the filler lid opening detection switch 105a is kept closed because the filler lid 203 is left open, a charge current for the capacitor 95c in the timed energizing circuit 119B is decreased and the cut-off transistor 95a eventually stops conducting. A base current to the energizing transistor 118a is therefore cut off and the logic level of the monitor signal MNI shifts to "L". Consequently, even when the filler lid opening detection switch 105a is kept closed, the power supply relay 102 is not energized continuously.

Hence, in the second embodiment, Step 428 of FIG. 4 described in the first embodiment above is not necessary and the microprocessor 10 does not have to issue the shutdown command SHD. Once the filler lid opening detection switch 105a is opened as the filler lid 203 is closed, charges charged in the capacitor 95c are discharged quickly via the discharge transistor 96a. When the filler lid opening detection switch 105a is closed again, a base current of the energizing transistor 118a is supplied as the cut-off transistor 95a conducts temporarily.

A function of the soak timer 28b in the sub-control circuit portion 120B is the same as that of FIG. 1. After an elapse of the predetermined waking hours Tu since the power supply switch 103 is opened, the soak timer 28b generates the waking command signal output DR2 to energize the power supply relay 102 and hence to wake up and start the microprocessor 10.

As is obvious from the description above, the in-vehicle electronic control unit according to the second embodiment of the invention is the in-vehicle electronic control unit 100B including the microprocessor 10 and fed via the output contact 102a in the power supply relay 102 that is directly energized from the in-vehicle battery 101 as the power supply switch 103 for vehicle operation is closed even when the microprocessor 10 is not operating. The microprocessor 10 controls the in-vehicle electrical load group 107 including at least the fuel injection solenoid valves 77 under control in response to an operation state of the in-vehicle sensor group 106.

The program memory 11B operating in cooperation with the microprocessor 10 pre-stores a control program realizing the decompression portion 111c including the cut-off timer 422 in addition to a control program realizing the input and output control portion 111a for vehicle operation.

The power supply relay 102 is directly energized even in a vehicle stop state in which the power supply switch 103 is not closed when at least one of the filler lid open command switch 104 and the filler lid opening detection switch 105a as an alternative to the power supply switch 103 is closed. Also, the power supply relay 102 is operated under timed energization so as not be energized when the filler lid opening detection switch 105a remains in a closed state for more than the predetermined limit period T0.

When the microprocessor 10 starts to operate as the power supply relay 102 is directly energized, the power supply relay 102 is operated under self-hold energization by the self-hold command output OUTE generated because the microprocessor 10 is operating normally. The filler lid opening detection switch 105a is a switch that is closed when the filler cap 202 is manually openable and closable as the filler lid 203 as a safety door provided on the outer surface of the filler cap 202 closing an opening end of the fuel pipe 201 communicating with the fuel tank 200 is fully or half opened by the filler lid opening actuator 71 or a manual operation.

The filler opening actuator 71 is a motor or an electromagnet that fully or half opens the filler lid 203 or brings the filler lid 203 in a half opened state by cancelling a closed and locked state thereof.

The decompression processing portion 111c discharges an internal pressure of the fuel tank 200 to the atmosphere via the canister 210 adsorbing evaporated fuel by energizing and opening the sealing valve opening solenoid valve 72 provided between the fuel tank 200 and the canister 210 at least once when the filler lid open command switch 104 or the filler lid opening detection switch 105a is closed. After an elapse of a predetermined time or upon detection that an internal pressure of the fuel tank 200 detected by the tank pressure sensor 61 as a part of the in-vehicle sensor group 106 drops within a predetermined threshold range in the vicinity of atmospheric pressure, the decompression processing portion 111c drives the filler opening actuator 71 to open the filler lid 203 in a case where the filler opening actuator 71 is provided. Thereafter, the decompression processing portion 111c stops the self-hold command output CUTE because the filler cap 202 and the filler lid 203 are closed manually upon completion of refueling and the sealing valve opening solenoid valve 72 is de-energized and sealed or de-energizes and seals the sealing valve opening solenoid valve 72 because the self-hold command output OUTE stops.

The cut-off timer 422 stops the self-hold command output OUTE when the filler lid 203 is not closed even after an elapse of the predetermined cut-off threshold time T1 since the filler lid open command switch 104 or the filler lid opening detection switch 105a is closed.

The decompression processing portion 111c discharges an internal pressure of the fuel tank 200 to the atmosphere via the canister 210 adsorbing evaporated fuel by energizing and opening the sealing valve opening solenoid valve 72 provided between the fuel tank 200 and the canister 210 at least once when the filler lid open command switch 104 or the filler lid opening detection switch 105a is closed. After an elapse of the predetermined time or upon detection that an internal pressure of the fuel tank 200 detected by the tank pressure sensor 61 as a part of the in-vehicle sensor group 106 drops within the predetermined threshold range in the vicinity of the atmospheric pressure, in a case where the filler lid 203 is of a manual open type, the decompression processing portion 111c drives an opening permission alarm of the filler lid 203 or stops the driving of the opening inhibition alarm 76 driven upon energization and opening of the sealing valve opening solenoid valve 72.

The filler lid opening detection switch 105a is closed when the filler lid 203 is manually openable in a half or more opened state as the closed and locked state thereof is cancelled by the filler lid opening actuator 71 or a manual operation.

The power supply relay 102 is directly energized within the predetermined limit period T0 as the filler lid opening detection switch 105a is closed.

When the filler lid opening detection switch 105a is closed, the microprocessor 10 continues to energize and open the sealing valve opening solenoid valve 72 at least once until the internal pressure of the fuel tank 200 drops within the predetermined range in the vicinity of the atmospheric pressure.

The predetermined limit period T0 is equal to or longer than a response delay time ΔT since the power supply relay 102 is energized until the microprocessor 10 starts to operate normally and equal to or shorter than the predetermined cut-off threshold time T1 that is a set time in the cut-off timer 422.

The exciting coil 102b in the power supply relay 102 is driven when fed from the in-vehicle battery 101 via the energizing transistor 118a.

Conduction drive signals are supplied to the energizing transistor 118a from each of the power supply switch 103, the filler lid open command switch 104, the filler lid opening detection switch 105a, and the self-hold command output OUTE via the drive resistors 113c, 114c, 115c, and 118c and the series diodes 113d, 114d, 115d, and 118d, respectively. The cut-off transistor 95a forming the timed energizing circuit 119B is connected in series between the filler lid opening detection switch 105a and the drive resistor 115c.

The timed energizing circuit 119B has the capacitor 95c that opens the cut-off transistor 95a after an elapse of the predetermined limit period T0 since the filler lid opening detection switch 105a is closed. The timed-energizing circuit 119B is initialized when charges charged in the capacitor 95c are discharged as the filler lid opening detection switch 105a is opened.

As has been described, in a case where the power supply relay is energized in response to the closing of the filler lid opening detection switch, the timed energizing circuit starts to operate after an elapse of the predetermined limit period and directly cuts off the energizing circuit in the power supply relay operating in response to the filler lid opening detection switch. Hence, when the filler lid is left open, the energizing circuit in the power supply relay becomes invalid and the power supply relay is de-energized within the predetermined cut-off threshold time. Accordingly, there are characteristics that the power supply relay is not energized again even when the filler lid open command switch is kept closed, and that the timed energizing circuit restores to the initial state once the filler lid open command switch is opened and feeding to the timed energizing circuit is stopped.

In each of the in-vehicle electronic control units 100A and 100B according to the first embodiment and the second embodiment, respectively, the main control circuit portion 110A or 110B chiefly formed of the microprocessor 10 and the program memory 11A or 11B operates on an output voltage of the main power supply circuit 112 fed from the in-vehicle battery 101 via the output contact 102a in the power supply relay 102. The program memory 11A or 11B pre-stores a control program realizing the leakage detection portion 111b. The in-vehicle electronic control unit 100A or 100B further includes the sub-power supply circuit 122 fed directly from the in-vehicle battery 101 and the sub-control circuit portion 120A or 120B that operates when fed train the sub-power supply circuit 122. Moreover, the sub-control circuit portion 120A or 120B includes the soak timer 28b connected to the microprocessor 10 in serial to each other via the serial parallel converters 15 and 25.

The soak timer 28b receives in advance the set value of the waking hours Tu from the microprocessor 10 and stores the set value in a set value register or the current value register 28a, and starts a timekeeping operation according to the timekeeping start command signal STA received in a time zone during which the power supply switch 103 is opened and the power supply replay 102 is continuously fed by the self-hold command output DR1 or CUTE. The soak timer 28b generates the waking command signal output DR2 after an elapse of the set waking hours Tu.

The energizing transistor 118a is supplied with a conduction drive signal from the waking command signal output DR2 via the drive resistor 128c and the series diode 128d and energizes the power supply relay 102.

The microprocessor 10 de-energizes the power supply relay 102 by stopping the self-hold command output DR1 or CUTE when the timekeeping start command signal STA is sent. However, the microprocessor 10 generates again the self-hold command output DR1 or CUTE when woken up and started in response to generation of the waking command signal output DR2. The microprocessor 10 then stops the waking command signal output DR2 by sending a reset command to the soak timer 28b and stops again the self-hold command DR1 or OUTE after making a determination as to whether there is a leakage narrow mouth of the fuel tank 200 using the leakage detection control portion 111b.

The leakage detection control portion 111b further includes the refuel priority portion 538 that runs the decompression processing portion 111c with a higher priority. When a running condition of the decompression processing portion 111c is established while the leakage detection control portion 111b is run, running of the leakage detection control portion 111b is stopped.

As has been described, the soak timer operated by constant feeding from the in-vehicle battery wakes up and starts the microprocessor when the predetermined waking hours have elapsed since the power supply switch is turned OFF, so that a leakage detection of the fuel tank is performed. Also, the decompression processing portion for the fuel tank run during the refueling is run with a higher priority than the leakage detection portion. Hence, no erroneous determination is made by performing a leakage detection while the filler cap is opened. Accordingly, there are characteristics that a correct determination can be made because the filler opening control and the leakage detection control are performed in cooperation with each other and that a control burden on the microprocessor can be lessened because it is not necessary to perform the filler opening control and the leakage detection control at the same time.

Third Embodiment

Figure 9:
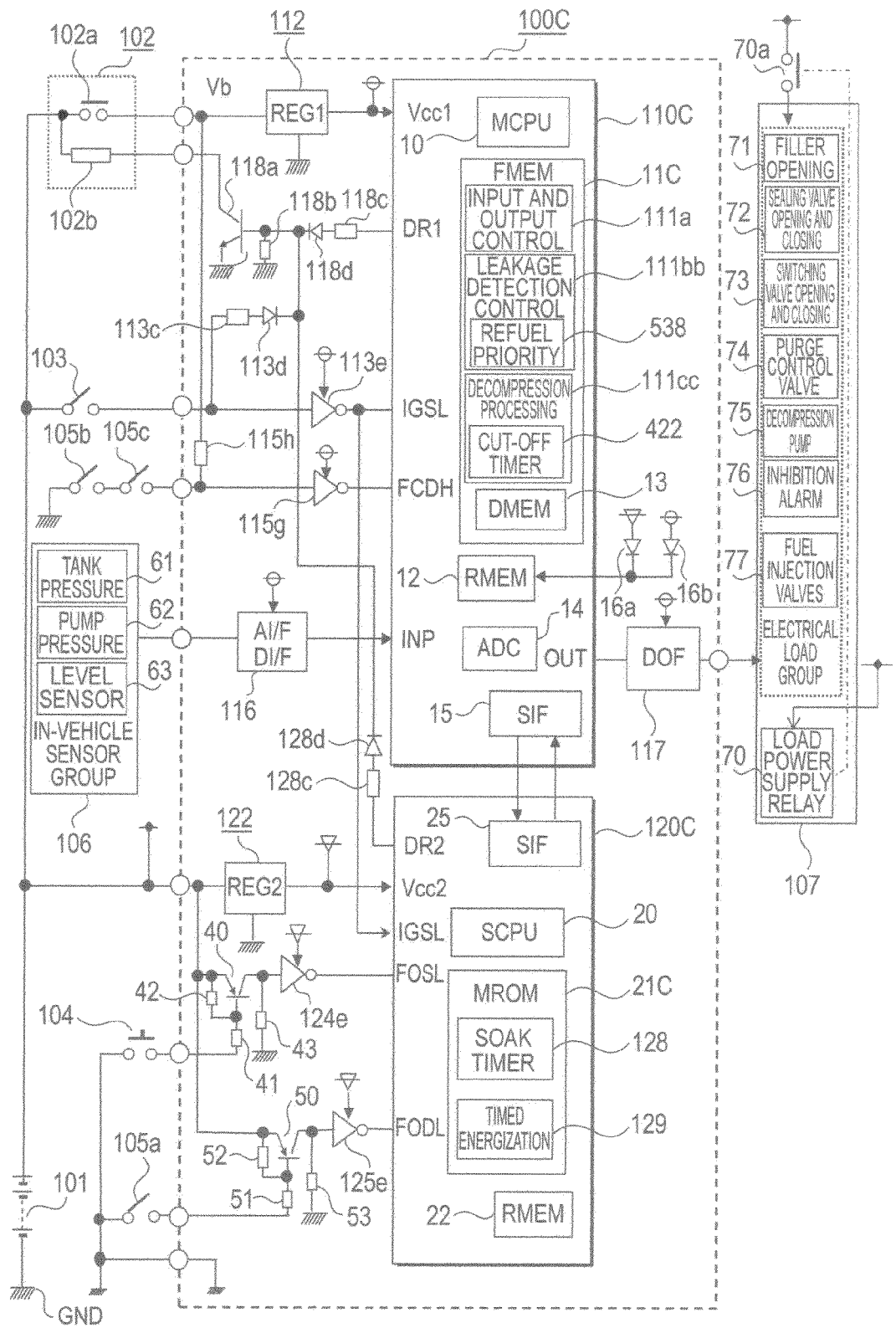
FIG. 9 is an overall circuit block diagram of an in-vehicle electronic control unit according to a third embodiment of the invention.

A description will be given to FIG. 9 showing an overall circuit block diagram of an in-vehicle electronic control unit according to a third embodiment of the invention and a difference from the first embodiment described above with reference to FIG. 1 will be chiefly described. Reference numerals of FIG. 9 same as those of FIG. 1 denote the same or equivalent portions.

Referring to FIG. 9, as in FIG. 1, an in-vehicle battery 101, a power supply relay 102, a power supply switch 103, a filler lid open command switch 104, a filler lid opening detection switch 105a, an in-vehicle sensor group 106, and an in-vehicle electrical load group 107 are connected to the outer portion of an in-vehicle electronic control unit 100C. It should be noted, however, that the filler lid open command switch 104 and the filler lid opening detection switch 105a are connected to the side of the ground circuit GND and signals therefrom are inputted into a sub-control circuit portion 120C. Also, a filler cap closing detection switch 105c is connected in series to a filler lid closing detection switch 105b.

As in FIG. 1, a main control circuit 110C fed from a main power supply circuit portion 112 and a sub-control circuit portion 120C constantly fed from a sub-power supply circuit 122 are provided inside the in-vehicle electronic control unit 1000. A a drive circuit of an energizing transistor 118a that energizes the power supply relay 102, an input interface circuit 116, and an output interface circuit 117 are formed in the same manner. It should be noted, however, that a base current of the energizing transistor 118a supplied when the filler lid open command switch 104 or the filler lid opening detection switch 105a is closed is supplied via a drive resistor 128c and a series diode 128d by a waking command signal output DR2 generated by the sub-control circuit portion 120C.

As with the counterpart of FIG. 1, the main control circuit portion 110C is formed by interconnecting a microprocessor 10, a program memory 110, a RAM memory 12, a data memory 13, a multi-channel A-to-D converter 14, and a serial parallel converter 15 via buses. The program memory 110 pre-stores control programs realizing the input output control portion 111a and the unillustrated save processing portion described above with reference to FIG. 3, a leakage detection control portion 111bb including a refuel priority portion 538 and described below with reference to FIG. 12, and a decompression processing portion 111 cc including a cut-off timer 422 described below with reference to FIG. 11. It should be noted, however, that the data memory 13 uses a partial region in the program memory 11C formed of a flash memory.

The sub-control circuit portion 120C is formed by interconnecting a sub-CPU 20, an auxiliary program memory 21C, which is, for example, a mask ROM memory, a RAM memory 22, and a serial parallel converter 25 via buses. The auxiliary program memory 21C pre-stores control programs realizing a soak timer 128 and a timed energizing portion 129 described below with reference to FIG. 10.

A connection configuration of the power supply switch 103 and the energizing transistor 118a by the self-hold command output DR1, a relation between the power supply switch 103 and a power supply switch closing signal IGSL, and a relation between the filler lid closing detection switch 105b and a filler closing detection signal FCDH are the same as those in the case of FIG. 1.

A base resistor 41 of a first source transistor 40, which is a PNP transistor directly connected to the in-vehicle battery 101, is connected to the ground circuit GND via the filler lid open command switch 104. Hence, the first source transistor 40 starts conducting when the filler lid open command switch 104 is closed. Then, a filler open command signal FOSL is inputted into the sub-CPU 20 via a NOT element 124e and the logic level of the filler open command signal FOSL shifts to "L" when the filler lid open command switch 104 is closed. An opening stabilization resistor 42 is connected between an emitter terminal and a base terminal of the first source transistor 40 and a pull-down resistor 43 is connected to an input terminal of the NOT element 124e.

Likewise, a base resistor 51 of a second source transistor 50, which is a PNP transistor directly connected to the in-vehicle battery 101, is connected to the ground circuit GND via the filler lid opening detection switch 105a. Hence, the second source transistor 50 starts conducting when the filler lid opening detection switch 105a is closed. Then, a filler opening detection signal FODL is inputted into the sub-CPU 20 via a NOT element 125e and the logic level of the filler opening detection signal FODL shifts to "L" when the filler lid opening detection switch 105a is closed. An opening stabilization resistor 52 is connected between an emitter terminal and a base terminal of the second source transistor 50 and a pull-down resistor 53 is connected to an input terminal of the NOT element 125e.

Alternatively, it may be configured in such a manner that the filler lid open command switch 104 is connected to the in-vehicle battery 101 by omitting the first source transistor 40 so that a signal therefrom is inputted into the NOT element 124e. Likewise, it may be configured in such a manner that the filler lid opening detection switch 105a is connected to the in-vehicle battery 101 by omitting the second source transistor 50 so that a signal therefrom is inputted into the NOT element 125e.

Hereinafter, a function and an operation of the in-vehicle electronic control unit of the third embodiment configured as in FIG. 9 will be described and a difference from the first embodiment described above with reference to FIG. 1 will be chiefly described. A function and an operation are the same as those depicted by the flowchart shown in FIG. 3 and the time charts shown in FIGS. 6A through 6H and 6J through 6N except for a part of operation described below.

Firstly, a brief description will be given to FIG. 9. When the power supply switch 103 is closed to operate the vehicle, a base current of the energizing transistor 118a is supplied via the drive resistor 113c and the series diode 113d. The exciting coil 102b in the power supply relay 102 is energized as the energizing transistor 118a starts conducting and the output contact 102a in the power supply relay 102 is closed. Then, the main power supply circuit 112 in the in-vehicle electronic control unit 100C is fed and a main control power supply voltage Vcc1 is applied to the main control circuit portion 110C. Hence, the microprocessor 10 starts to operate and the in-vehicle electrical load group 107, for example, fuel injection solenoid valves, sparking coils, or a throttle valve angle control motor, is driven under control in response to an operation state of the in-vehicle sensor group 106 and the content of a control program pre-stored in the program memory 11C and realizing the input output control portion 111a.

Once the microprocessor 10 starts to operate, a base current of the energizing transistor 118a is supplied from the self-hold command output DR1 generated by the microprocessor 10 because the microprocessor 10 is operating normally via the drive resistor 118c and the series diode 118d and the power supply relay 102 is operated under self-hold energization by the microprocessor 10.

When the power supply switch 103 is opened as the vehicle is stopped, the power supply relay 102 is continuously energized by the self-hold command output DR1 and the microprocessor 10 is therefore continuously fed. In this continuous feeding period, the control program realizing the save processing portion 111d described above with reference to FIG. 3 is run. Accordingly, the self-hold command output DR1 is cancelled so that the power supply relay 102 is de-energized and the output contact 102a is opened only after a completion of processing, such as to transfer and save learning information and abnormality occurrence information acquired and stored in the RAM memory 12 while the vehicle is in motion into the non-volatile data memory 13 and to send a timekeeping start command signal STA to the soak timer 128. This continuous feeding period is a time, for example, as short as or shorter than 0.1 sec. In contrast, the soak timer 128 generates the waking command signal output DR2 at the timing when the engine is cooled sufficiently, for example, five hours later since the timekeeping start command signal STA is received or the microprocessor 10 stops operating.

In a parked state in which the power supply switch 103 is opened, when the filler lid open command switch 104 or the filler lid opening detection switch 105a is closed, the waking command signal output DR2 is generated by a timed energizing portion 129 described below with reference to FIG. 10 only for a predetermined period and a base current of the energizing transistor 118a is supplied via the drive resistor 128c and the series diode 128d. Then, the power supply relay 102 is energized and the microprocessor 10 is started and generates the self-hold command output DR1 and also runs the control program realizing the decompression processing portion 111cc described above. Thereafter, the power supply relay 102 is de-energized as the self-hold command output DR1 is cancelled when the filler lid 203 is closed manually upon completion of refueling or a predetermined cut-off threshold time T1, for example, 20 min, has elapsed. It should be noted, however, that in a case where the filler lid opening detection switch 105a is kept closed because the filler lid 203 is left open, the timed energizing portion 129 prevents the waking command signal output DR2 from being generated continuously.

A function of the soak timer 128 in the sub-control circuit portion 120C is the same as in the case of FIG. 1. After an elapse of the predetermined waking hours Tu since the power supply switch 103 is opened, the soak timer 128 generates the waking command signal output DR2 to energize the power supply relay 102 and hence to wake up and start the microprocessor 10.

Figure 10:
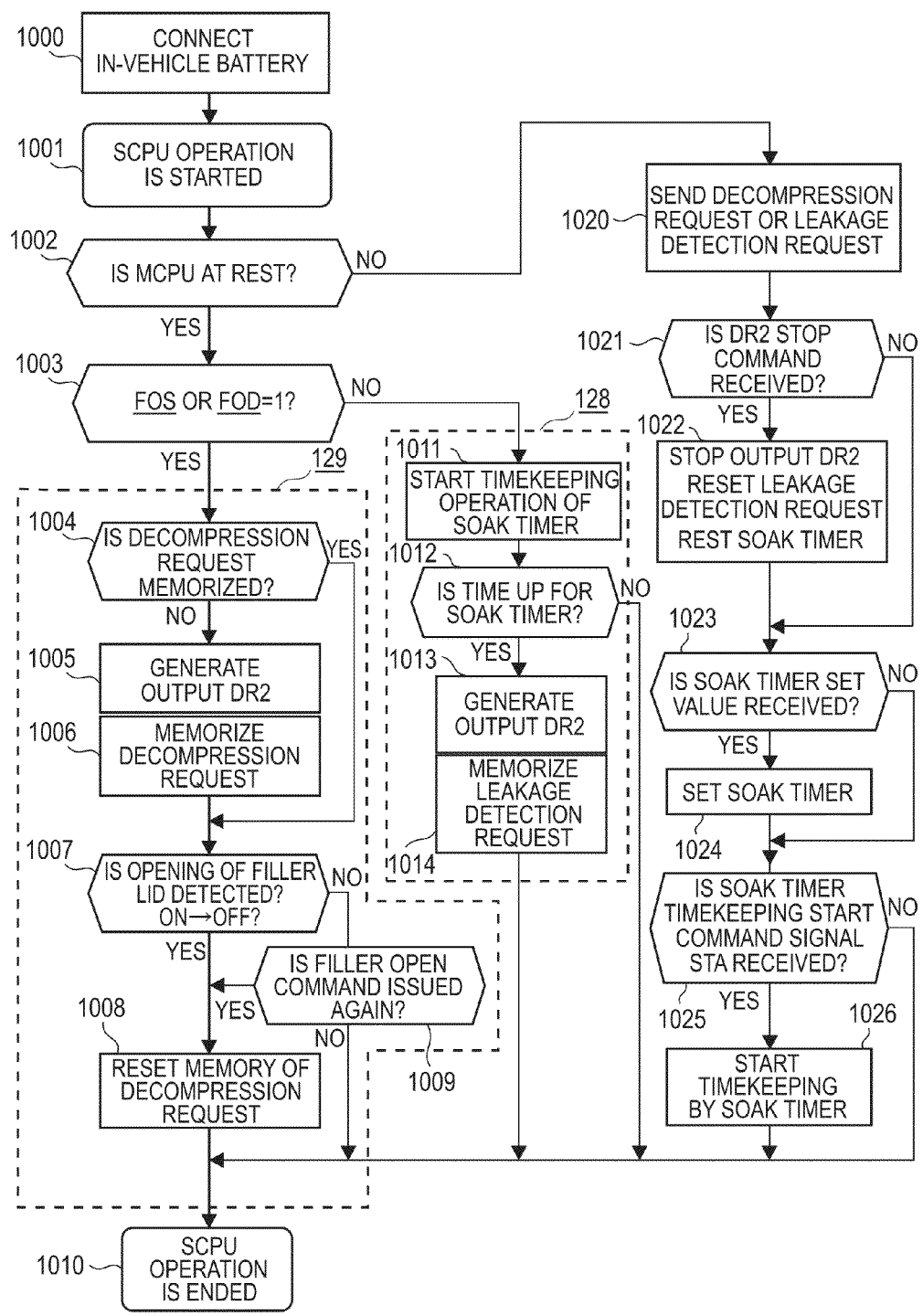
FIG. 10 is a flowchart depicting an operation of a sub-CPU in the in-vehicle electronic control unit according to the third embodiment of the invention.
Figure 11:
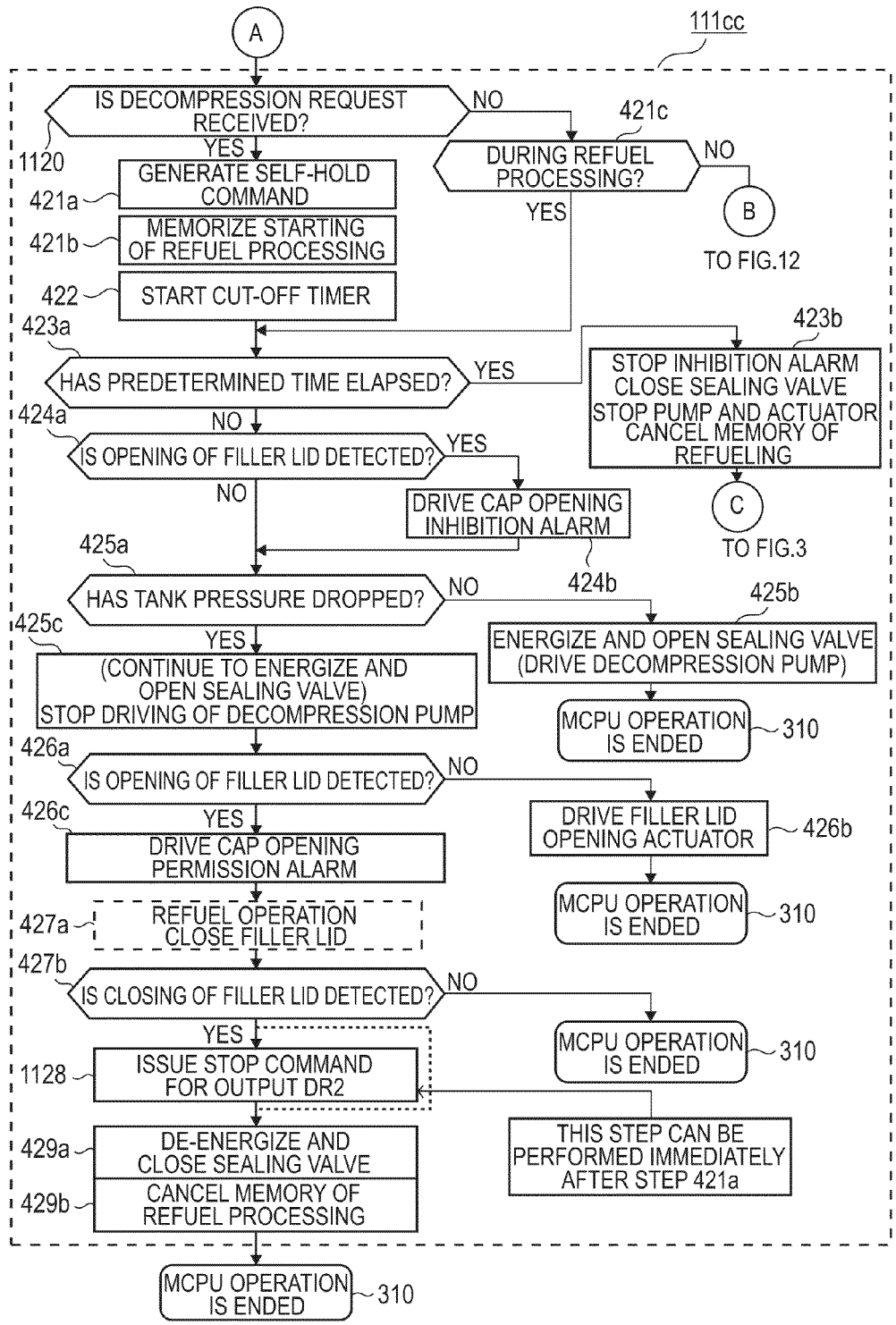
FIG. 11 is a flowchart depicting an operation of a main CPU in the in-vehicle electronic control unit according to the third embodiment of the invention.

A description will now be given to FIG. 10 showing a flowchart depicting an operation of the sub-CPU 20 of FIG. 9, FIG. 11 showing a flowchart depicting a middle stage operation of the microprocessor 10 of FIG. 9 serving as the main CPU, and FIG. 12 showing a flowchart depicting a last-half stage operation of the microprocessor 10 of FIG. 9 serving as the main CPU. A flowchart depicting a first-half stage operation of the main CPU is the same as the one shown in FIG. 3. FIG. 11 and FIG. 12 are the same as FIG. 4 and FIG. 5, respectively, except for a partial modification.

Referring to FIG. 10, the in-vehicle battery 101 and the in-vehicle electronic control unit 100C are connected in Step 1000. Then, the sub-CPU 20 is started in Step 1001 independently of whether the power supply switch 103 is closed or opened.

Subsequent Step 1002 is a determination step in which it is determined whether the microprocessor 10 serving as the main CPU is at rest. When the microprocessor 10 is at rest, a determination of YES is made and the flow proceeds to Step 1003. When the microprocessor 10 is not at rest, a determination of NO is made and the flow proceeds to Step 1020. Whether the microprocessor 10 is at rest or not is determined by monitoring the logic level of the power supply switch closing signal IGSL inputted into the sub-CPU 20 or by checking whether a serial communication is established by the serial parallel converters 15 and 25.

Step 1003 is a determination step in which it is monitored whether at least one of the filler lid open command switch 104 and the filler lid opening detection switch 105a is closed. When at least one of the filler lid open command switch 104 and the filler lid opening detection switch 105a is closed, a determination of YES is made and the flow proceeds to Step 1004 and when neither the filler lid open command switch 104 nor the filler lid opening detection switch 105a is closed, a determination of NO is made and the flow proceeds to Step 1011.

Step 1004 is a determination step for a refuel operation, in which it is determined whether there is a decompression request for the fuel tank 200 by attempting to read out the decompression request in Step 1006 described below. When the decompression request is already memorized, a determination of YES is made and the flow proceeds to Step 1007. When no decompression request is issued yet because this is a first-time operation, a determination of NO is made and the flow proceeds to Step 1005.

After the waking command signal output DR2 is generated in Step 1005, the flow proceeds to Step 1006. After the issuance of the decompression request is memorized in Step 1006, the flow proceeds to Step 1007. The decompression request memorized in Step 1006 is sent to the microprocessor 10 in Step 1020 described below as the power supply relay 102 is energized upon generation of the waking command signal output DR2 in Step 1005 and hence the microprocessor 10 is started. When the microprocessor 10 is started, the waking command signal output DR2 is stopped in Step 1128 of FIG. 11 described below.

Step 1007 is a determination step in which it is monitored whether the filler lid opening detection switch 105a is changed from a closed state to an opened state. When the filler lid opening detection switch 105a is changed, a determination of YES is made and the flow proceeds to Step 1008. When the filler lid opening detection switch 105a is not changed, a determination of NO is made and the flow proceeds to Step S1009.

Step 1009 is a determination step in which it is determined whether the filler lid open command switch 104 is closed again. When the filler lid open command switch 104 is closed again, a determination of YES is made and the flow proceeds to Step 1008. When the filler lid open command switch 104 is not closed again, a determination of NO is made and the flow proceeds to operation ending Step 1010.

After the decompression request memorized in Step 1006 is reset in Step 1008, the flow proceeds to operation ending Step 1010. In operation ending Step 1010, the sub-CPU 20 runs another control program and the flow returns to operation starting Step 1001 within a predetermined limit period. Hence, even when the filler lid opening detection switch 105a is kept closed in Step 1003, once the decompression request is memorized in Step 1006, the waking command signal output DR2 in Step 1005 is not generated again. This state is maintained until a determination of YES is made in Step 1007 as the closed filler lid opening detection switch 105a is opened upon completion of the refuel operation or until the memorized decompression request is reset in Step 1008 as a determination of YES is made in Step 1009 because the filler lid open command switch 104 is closed again.

In Step 1011, the soak timer 128 starts a timekeeping operation to measure waking hours for a leakage detection according to a set time and the timekeeping start command signal STA received, respectively, in Step 1024 and Step 1026 described below.

Subsequent Step 1012 is a determination step in which it is determined whether the time is up for the soak timer 128. When the time is not up for the soak timer 128, a determination of NO is made and the flow proceeds to operation ending Step 1010 so that the timekeeping operation is continued. When the time is up for the soak timer 128, a determination of YES is made and the flow proceeds to Step 1013.

After the waking command signal output DR2 is generated in Step 1013 and a leakage detection request is memorized in subsequent Step 1014, the flow proceeds to operation ending Step 1010. When the waking command signal output DR2 is generated in Step 1013, the power supply relay 102 is energized and hence the microprocessor 10 is started. Accordingly, the leakage detection request is sent in Step 1020.

After the decompression request issued in Step 1006 or the leakage detection request issued in Step 1014 is sent to the microprocessor 10 in step 1020, the flow proceeds to Step 1021.

Step 1021 is a determination step in which it is monitored whether a stop command for the waking command signal output DR2 issued in Step 1128 described below with reference to FIG. 11 or in Step 532 described below with reference to FIG. 12 is received. When the stop command is received, a determination of YES is made and the flow proceeds to Step 1022. When the stop command is not received yet, a determination of NO is made and the flow proceeds to Step 1023.

In Step 1022, the waking command signal output DR2 is stopped, the leakage detection request memorized in Step 1014 and sent in Step 1020 is reset, and the current value of the soak timer 128 is reset. Thereafter, the flow proceeds to Step 1023.

Step 1023 is a determination step in which it is monitored whether the set value of the soak timer 128 sent in Step 313 described above with reference to FIG. 3 is received. When the set value is received, a determination of YES is made and the flow proceeds to Step 1024. When the set value is not received, a determination of NO is made and the flow proceeds to Step 1025. The set time of the soak timer 128 may be sent when the power supply switch 103 is closed and once the set time is sent, the same set value is used until another set time is sent again.

Step 1025 is a determination step in which it is monitored whether the timekeeping start command signal STA for the soak timer 128 sent in Step 313 described above with reference to FIG. 3 is received. When the timekeeping start command signal STA is received, a determination of YES is made and the flow proceeds to Step 1026. When the timekeeping start command signal STA is not received, a determination of NO is made and the flow proceeds to operation ending Step 1010. After a timekeeping start command signal STA is issued to the soak timer 128 in Step 1026, the flow proceeds to the operation ending Step 1010.

Step Block 129 made up of Step 1004 through Step 1009 corresponds to a timed energizing portion that runs the decompression processing portion 111 cc described below with reference to FIG. 11, and it is a replacement for the timed energizing circuits 119A and 119B of FIG. 1 and FIG. 7, respectively.

Step Block 128 made up of Step 1011 through Step 1014 corresponds to the soak timer 128 and Step 1020 corresponds to the request signal sending portion. In the cases of FIG. 1 and FIG. 7, the power supply relay 102 is energized by the waking command signal output DR2 only for the purpose of a leakage detection. In contrast, in the case of FIG. 9, the waking command signal output DR2 is generated for the purpose of performing decompression processing of the fuel tank 200 for a refuel operation and for the purpose of a leakage detection. Hence, the purposes are distinguished and then the result is sent to the microprocessor 10 in Step 1020.

The first-half stage operation of the microprocessor 10 is as shown in FIG. 3 and the middle-stage operation and the last-half stage operation are depicted by the flowcharts of FIG. 11 and FIG. 12, respectively.

In steps of FIG. 11 labeled with 400th numbers, operations are the same as those in the case of FIG. 4. In step of FIG. 12 labeled with 500th numbers, operations are the same as those in the case of FIG. 5. Hereinafter, different steps labeled with 1100th numbers and 1200th numbers will be described.

Referring to FIG. 11, Step 1120 is a determination step in which it is monitored whether there is a decompression request signal sent from the sub-CPU 20 in step 1020 of FIG. 10. When there is the decompression request, a determination of YES is made and the flow proceeds to Step 421a. When there is no decompression request, a determination of NO is made and the flow proceeds to Step 421c.

Step 1128 is a step in which a stop command for the waking command signal output DR2 generated in Step 1005 of FIG. 10 is sent. This step may be performed immediately after the self-hold command output DR1 is generated in Step 421a.

Referring to FIG. 12, Step 1133 is a step in which a cancel command for the leakage detection request issued in Step 1014 of FIG. 10 is sent. The flow then proceeds to Step 533a.

Step 1137 is a determination step in which it is monitored whether the filler lid open command switch 104 is closed or whether the filler lid opening detection switch 105a is closed. When either the filler lid open command switch 104 or the filler lid opening detection switch 105a is closed, a determination of YES is made and the flow proceeds to Step 538. When both of the filler lid open command switch 104 and the filler lid opening detection switch 105a are opened, a determination of NO is made and the flow returns to Step 533b.

While it has been described on the assumption that the filler opening actuator 71 is a motor or an electromagnet that releases the closing and locking mechanism, it may be a motor that makes the filler lid 203 fully open. In a case where the filler opening actuator 71 is not provided and the closing and locking mechanism is manually released with a remote wire, it is possible to let the opening inhibition alarm 76 of the filler cap 202 blink or sound when the filler lid 203 is released from a closed and locked state or let the opening permission alarm operate after the decompression processing of the fuel tank 200 is completed.

In each of the embodiments above, the self-hold command output for the power supply relay 102 can be either the self-hold command output DR1 generated directly by the microprocessor 10 as is shown in FIG. 1 or the output enabling signal OUTE generated by the watchdog timer 18 as is shown in FIG. 7. Also, while the respective embodiments have been described on the assumption that the transistors are junction type transistors each having emitter, collector and base terminals and the conduction drive signals are base currents. However, the respective transistors may be field effect transistors each having source, drain, and gate terminals. In this case, gate voltages applied to the gate terminals are the conduction drive signals.

As has been described in detail above, the in-vehicle electronic control unit of the third embodiment is the in-vehicle electronic control unit 100C including the microprocessor 10 and fed via the output contact 102a in the power supply relay 102 that is directly energized from the in-vehicle battery 101 as the power supply switch 103 for vehicle operation is closed even when the microprocessor 10 is not operating. The microprocessor 10 controls the in-vehicle electrical load group 107 including at least the fuel injection solenoid valves 77 under control in response to an operation state of the in-vehicle sensor group 106. The program memory 11C operating in cooperation with the microprocessor 10 pre-stores a control program realizing the decompression processing portion 111 cc including the cut-off timer 422 in addition to a control program realizing the input and output control portion 111a for vehicle operation.

The power supply relay 102 is directly energized even in a vehicle stop state in which the power supply switch 103 is not closed when at least one of the filler lid open command switch 104 and the filler lid opening detection switch 105a as an alternative to the power supply switch 103 is closed. The power supply relay 102 is operated under timed energization so as not to be energized when the filler lid opening detection switch 105a remains in a closed state over the predetermined limit period T0. When the power supply relay 102 is directly energized and the microprocessor 10 therefore starts to operate, the power supply relay 102 is operated under self-hold energization by the self-hold command output DR1 that is generated because the microprocessor 10 is normally operating.

The filler lid opening detection switch 105a is a switch that is closed when the filler lid 203 as a safety door provided on the outer surface of the filler cap 202 closing an opening end of the fuel pipe 201 communicating with the fuel tank 200 is fully or half opened by the filler opening actuator 71 or a manual operation and the filler cap 202 is manually openable and closable.

The filler opening actuator 71 is a motor or an electromagnet that fully or half opens the filler lid 203 or brings the filler lid 203 into a half opened state by cancelling the closed and locked state of the filler lid 203. The decompression processing portion 111 cc discharges an internal pressure of the fuel tank 200 to the atmosphere via the canister 210 adsorbing evaporated fuel by energizing and opening the sealing valve opening solenoid valve 72 provided between the fuel tank 200 and the canister 210 at least once when the filler lid open command switch 104 or the filler lid opening detection switch 105a is closed. After an elapse of a predetermined time or upon detection that that the internal pressure of the fuel tank 200 detected by the tank pressure sensor 61 as a part of the in-vehicle sensor group 106 drops within a predetermined threshold range in the vicinity of atmospheric pressure, the decompression processing portion 111 cc drives the filler opening actuator 71 to open the filler lid 203 in a case where the filler opening actuator 71 is provided. Thereafter, the decompression processing portion 111 cc stops the self-hold command output DR1 because the filler cap 202 and the filler lid 203 are closed manually upon completion of refueling and the sealing valve opening solenoid valve 72 is de-energized and sealed or de-energizes and seals the sealing valve opening solenoid valve 72 because the self-hold command output DR1 stops.

The cut-off timer 422 stops the self-hold command output DR1 when the filler lid 203 is not closed even after an elapse of the predetermined cut-off threshold time T1 since the filler lid open command switch 104 or the filler lid opening detection switch 105a is closed.

The decompression processing portion 111 cc discharges an internal pressure of the fuel tank 200 to the atmosphere via the canister 210 adsorbing evaporated fuel by energizing and opening the sealing valve opening solenoid valve 72 provided between the fuel tank 200 and the canister 210 at least once when the filler lid open command switch 104 or the filler lid opening detection switch 105a is closed. After an elapse of the predetermined time or upon detection that an internal pressure of the fuel tank 200 detected by the tank pressure sensor 61 as a part of the in-vehicle sensor group 106 drops within the predetermined threshold range in the vicinity of the atmospheric pressure, in a case where the filler lid 203 is of a manual open type, the decompression processing portion 111 cc drives an opening permission alarm of the filler lid 203 or stops the driving of the opening inhibition alarm 76 driven upon energization and opening of the sealing valve opening solenoid valve 72.

The filler lid opening detection switch 105a is closed when the filler lid 203 is manually openable in a half or more opened state as the closed and locked state thereof is cancelled by the filler opening actuator 71 or a manual operation. The power supply relay 102 is directly energized within the predetermined limit period T0 because the filler lid opening detection switch 105a is closed.

When the filler lid opening detection switch 105a is closed, the microprocessor 10 continues to energize and open the sealing valve opening solenoid valve 72 at least once until the internal pressure of the fuel tank 200 drops within the predetermined threshold range in the vicinity of the atmospheric pressure. The predetermined limit period T0 is equal to or longer than a response delay time ΔT since the power supply relay 102 is energized until the microprocessor 10 starts to operate normally and equal to or shorter than the predetermined cut-off threshold time T1 that is a set time in the cut-off timer 422.

The main control circuit portion 110C chiefly formed of the microprocessor 10 and the program memory 11C operates on an output voltage of the main power supply circuit 112 fed from the in-vehicle battery 101 via the output contact 102a in the power supply relay 102. The program memory 11C pre-stores a control program realizing the leakage detection portion 111bb. The in-vehicle electronic control unit 100C further includes the sub-power supply circuit 122 fed directly from the in-vehicle battery 101 and the sub-control circuit 120C operating when fed from the sub-power supply circuit 122.

The sub-control circuit portion 120C is connected to the microprocessor 10 in serial to each other via the serial parallel converters 15 and 25 and includes the sub-CPU 20 operating in cooperation with the auxiliary program memory 21C. Signals at least from the filler lid open command switch 104 and the filler lid opening detection switch 105a are inputted into the sub-CPU 20. When the filler lid open command switch 104 or the filler lid opening detection switch 105a is closed, the sub-control circuit portion 120 generates the waking command signal output DR2 to energize the power supply relay 102 and sends a decompression processing request signal.

The auxiliary program memory 21C pre-stores a control program realizing the soak timer 128. The soak timer 128 receives in advance the set value of the waking hours Tu from the microprocessor 10 and stores the set value in the auxiliary RAM memory 22. The soak timer 128 starts a timekeeping operation according to the timekeeping start command signal STA received in a time zone during which the power supply switch 103 is opened and the power supply relay 102 is continuously fed by the self-hold command output DR1 or OUTE. The soak timer 128 generates the waking command signal output DR2 after an elapse of the set waking hours Tu to energize the power supply relay 102 and sends the leakage detection request signal.

The microprocessor 10 de-energizes the power supply relay 102 by stopping the self-hold command output DR1 or OUTE as the timekeeping start command signal STA is sent, and generates the self-holding command output DR1 or OUTE again when woken up and started in response to generation of the waking command signal output DR2. The microprocessor 10 sends a reset command to the sub-CPU 20 to stop the waking command signal output DR2 and then stops again the self-hold command output DR1 or OUTE after making a determination as to whether there is a leakage narrow mouth of the fuel tank 200 using the leakage detection control portion 111bb or the decompression processing is performed using the decompression processing portion 111 cc depending on the content of the request signal.

The leakage detection control portion 111bb further includes the fuel priority portion 538 that runs the decompression processing portion 111cc with a higher priority. When the decompression processing request signal is generated while the leakage detection control portion 111bb is run, running of the leakage detection control portion 111b is stopped.

As has been described, the sub-CPU 20 operated by constant feeding from the in-vehicle battery 101 wakes up and starts the microprocessor 10 by the waking command signal output DR2 when the predetermined waking hours Tu have elapsed after the power supply switch 103 is turned OFF and performs a leakage detection of the fuel tank 200. The decompression processing portion 111 cc run for the fuel tank 200 during refueling is run with a higher priority than the leakage detection control portion 111bb. Signals from the filler lid open command switch 104 and the filler lid opening detection switch 105a are inputted into the sub-CPU 20 and the decompression processing of the fuel tank 200 is started by the waking command signal output DR2 and the decompression processing request signal.

Hence, no erroneous determination is made by performing a leakage detection while the filler cap 202 is opened. It thus becomes possible to make a correct determination as the filler opening control and the leakage detection control are performed in cooperation with each other. In addition, because it is not necessary to perform the filler opening control and the leakage detection control at the same time, a control burden on the microprocessor 10 can be lessened.

The exciting coil 102b in the power supply relay 102 is driven when fed from the in-vehicle battery 101 via the energizing transistor 118a. Conduction drive signals are supplied to the energizing transistor 118a from the power supply switch 103, the waking command signal output DR2, and the self-hold command output DR1 or OUTE via the drive resistors 113c, 128c, and 118c and the series diodes 113d, 128d, and 118d, respectively. The auxiliary program memory 21C pre-stores a control program realizing the timed energizing portion 129. When the filler lid open command switch 104 or the filler lid opening detection switch 105a is closed, the timed energizing portion 129 generates the waking command signal output DR2 after the predetermined limit period T0. As the waking command signal output DR2 is generated, issuance of the decompression processing request to be sent to the microprocessor 10 is memorized. Once the decompression processing request is issued, generation of the waking command signal output DR2 is inhibited until the filler lid opening detection switch 105a is opened or the filler lid open command switch 104 is closed again. The predetermined limit period T0 is equal to or longer than a response delay time ΔT since the power supply relay 102 is energized until the microprocessor 10 starts to operate normally and equal to or shorter than the predetermined cut-off threshold time T1 that is a set time in the cut-off timer 422.

As has been described, once the waking command signal output DR2 is generated, the timed energizing portion 129 operated by the sub-CPU 20 inhibits the waking command signal output DR2 from being generated again until the filler lid opening detection switch 105a is opened or the filler lid open command switch 104 is closed again.

Hence, it becomes possible to determine that the filler lid opening detection switch 105a is kept closed without depending on hardware. Hence, a continuous energization state of the power supply relay 102 can be avoided with an inexpensive configuration.

In each of the in-vehicle electronic control units 100A, 100B, and 100C of the first through third embodiments, respectively, the decompression pump 75 is installed in the air discharge channel of the canister 210. When the internal pressure of the fuel tank 200 is high, the decompression processing portion 111c or 111cc energizes and opens the sealing valve opening solenoid valve 72 and drives the decompression pump 75 at least once until the internal pressure of the fuel tank 200 drops within a predetermined threshold range in the vicinity of the atmospheric pressure. When the filler cap 202 is closed, the leakage detection control portion 111b or 111bb energizes and opens the sealing valve opening solenoid valve 72 and drives the decompression pump 75, so that it is determined whether there is a leakage narrow mouth by measuring a change of the negative pressure in the fuel tank 200 or the decompression tube channel and comparing the measured value with the reference value.

As has been described, the decompression pump 75 is located downstream of the canister 210. In a case where the internal pressure of the fuel tank 200 is high when a refuel operation is started, the sealing valve opening solenoid valve 72 is energized to open and the internal pressure is decreased to the atmospheric pressure by driving the decompression pump 75. The internal pressure is decreased further for the leakage detection control and a negative pressure generated in the fuel tank 200 or the decompression tube channel is measured.

Hence, with the use of the decompression pump 75 used to perform a leakage detection of the fuel tank 200, it becomes possible to open the filler cap 202 without a delay by decreasing the internal pressure of the fuel tank 200 quickly when a refuel operation is started.

In each of the in-vehicle electronic control units 100A, 100B, and 100C according to the first through third embodiments, respectively, the filler lid closing detection switch 105b in addition to the filler lid opening detection switch 105a is connected, as an input signal, to the microprocessor 10 or the sub-CPU 20. The filler cap closing detection signal 105c that is closed when the filler lid 203 is closed and it is sure that the filler cap 202 is closed or when the filler cap 202 is closed is connected in series to the filler lid closing detection switch 105b. The filler lid opening detection switch 105a and the filler lid open command switch 104 supply an output voltage of the in-vehicle battery 101 as an input signal voltage even when the power supply relay 102 is not operating. In contrast, the filler lid closing detection switch 105b becomes effective as an input signal only when the power supply relay 102 is operating. The leakage detection control portion 111b or 111bb is run when the filler lid closing detection switch 105b is closed.

As has been described, the filler lid closing detection switch 105b is provided and the leakage detection control portion 111b or 111bb is run when the filler lid closing detection switch 105b is closed. Also, the filler lid opening detection switch 105a and the filler lid open command switch 104 are provided to a source circuit that becomes effective even when the power supply relay 102 is not operating. On the contrary, the filler lid closing detection switch 105b is provided to a sink circuit that becomes effective when the power supply relay 102 is operating.

Hence, it becomes possible to detect opening and closing of the filler lid 203 in a reliable manner by fail and safe even at the occurrence of a contact failure in the switches or a contact failure in the connecting connectors.

Consequently, a leakage detection is not erroneously performed while the filler cap 202 is opened.

In a normal parked state in which the filler lid 203 is closed, a signal current does not flow into the filler lid opening detection switch 105a and the filler lid closing detection switch 105b. Hence, consumption of the in-vehicle battery 101 can be suppressed. Also, in a case where the filler lid 203 is kept open in a parked state, only a small current flows into the decompression processing circuit and the input signal circuit even when the filler lid opening detection switch 105a is kept closed. Hence, consumption of the in-vehicle battery 101 can be suppressed.

Various modifications and alterations of this invention will be apparent to those skilled in the art without departing from the scope and spirit of this invention, and it should be understood that this is not limited to the illustrative embodiments set forth herein.

What is claimed is:

1. An in-vehicle electronic control unit fed via an output contact in a power supply relay that is energized by an in-vehicle battery when a power supply switch for vehicle operation is closed, comprising:

a microprocessor that drives an electrical load group including at least fuel injection solenoid valves under control in response to an operation state of an in-vehicle sensor group; and a program memory that operates in cooperation with the microprocessor and pre-stores a control program comprising a decompression processing portion including a cut-off timer in addition to a control program comprising an input and output control portion for vehicle operation, wherein:

the power supply relay is energized by the in-vehicle battery via an energizing transistor during a vehicle stop state in which the power supply switch is not closed when at least one of a filler lid open command switch and a filler lid opening detection switch is closed, and the power supply relay is operated under timed energization so as not to energize the power supply relay when the filler lid opening detection switch remains in a closed state over a predetermined limit period while operated under self-hold energization by a self-hold command output generated by the microprocessor when directly energized and the microprocessor starts to operate;

an initial state corresponding to the limit period is restored and the power supply relay is operated again under timed energization when the filler lid open command switch is closed again after being opened, even after the limit period is expired when the filler lid open command switch is closed;

the filler lid opening detection switch operates in response to closing and opening states of a filler lid provided on an outer surface of a filler cap section of a fuel pipe which is connected to a fuel tank and is closed when the filler cap is in a manually openable and closable state as the filler lid is brought into one of a fully opened state, a half opened state, and a closing and locking cancelled state by one of driving of a filler opening actuator and a manual operation;

the decompression processing portion discharges an internal pressure of the fuel tank to atmosphere via a canister adsorbing evaporated fuel by energizing and opening a sealing valve opening solenoid valve provided between the fuel tank and the canister at least once when one of the filler lid open command switch and the filler lid opening detection switch is closed, and when the filler opening actuator is provided, drives the filler opening actuator to open the filler lid after one of an elapse of a predetermined time since the filler lid opening detection switch is closed and a detection of an internal pressure drop of the fuel tank within a predetermined threshold range in a vicinity of atmospheric pressure;

the decompression processing portion performs one of an action to stop the self-hold command output because the filler cap and the filler lid are closed upon completion of refueling and the sealing valve opening solenoid valve is de-energized and closed and an action to de-energize and seal the sealing valve opening solenoid valve because the self-hold command output stops; and the cut-off timer stops the self-hold command output when the filler lid is not closed even after an elapse of a predetermined cut-off threshold time since one of the filler lid open command switch and the filler lid opening detection switch is closed.

2. The in-vehicle electronic control unit according to claim 1, wherein:

the decompression processing portion discharges an internal pressure of the fuel tank to the atmosphere via the canister adsorbing evaporated fuel by energizing and opening the sealing valve opening solenoid valve provided between the fuel tank and the canister at least once when one of the filler lid open command switch and the filler lid opening detection switch is closed, and in a case where the filler lid is of a manual open type, performs one of an action to drive an opening enable alarm of the filler lid and an action to stop driving of an opening inhibition alarm driven as the sealing valve opening solenoid valve is energized to open after one of an elapse of a predetermined time and a detection of a dropping of the internal pressure of the fuel tank detected by a tank pressure sensor as a part of the in-vehicle sensor group within the predetermined threshold range in the vicinity of the atmospheric pressure.

3. The in-vehicle electronic control unit according to claim 1, wherein:

the filler lid opening detection switch is closed when the filler lid is manually openable in a half or more opened state because a closed and locked state thereof is cancelled by one of the filler lid opening actuator and a manual operation;

the power supply relay is directly energized within the predetermined limit period as the filler lid opening detection switch is closed;

the microprocessor continues to energize and open the sealing valve opening solenoid valve until the internal pressure of the fuel tank drops within the predetermined threshold range in the vicinity of the atmospheric pressure at least once when the filler lid opening detection switch is closed; and the predetermined limit period is equal to or longer than a response delay time since the power supply relay is energized until the microprocessor starts to operate normally and equal to or shorter than the predetermined cut-off threshold time that is a set time in the cut-off timer.

4. The in-vehicle electronic control unit according to claim 3, wherein:

an exciting coil in the power supply relay is driven when fed from the in-vehicle battery via the energizing transistor;

conduction driving signals are supplied to the energizing transistor from each of the power supply switch, the filler lid open command switch, the filler lid opening detection switch, and the self-hold command output via corresponding drive resistors and corresponding series diodes; and a timed energizing circuit is fed when the filler lid opening detection switch is closed, and the timed energizing circuit memorizes issuance of a shutdown command outputted by the microprocessor at arbitrary timing in the predetermined limit period using a latch circuit, so that the conduction drive signal to the energizing transistor via the drive resistor and the series diode connected to the filler lid opening detection switch is cut off by a cut-off transistor, and the latch circuit is reset when the filler lid opening detection switch is opened.

5. The in-vehicle electronic control unit according to claim 3, wherein:

an exciting coil in the power supply relay is driven when fed from the in-vehicle battery via the energizing transistor;

conduction drive signals are supplied to the energizing transistor from each of the power supply switch, the filler lid open command switch, the filler lid opening detection switch and the self-hold command output via corresponding drive resistors and corresponding series diodes;

a cut-off transistor forming a timed energizing circuit is connected in series between the filler lid opening detection switch and the drive resistor; and the timed energizing circuit has a capacitor that opens the cut-off transistor upon elapse of the predetermined limit period since the filler lid opening detection switch is closed and is initialized as charges charged in the capacitor are discharged as the filler lid opening detection switch is opened.

6. The in-vehicle electronic control unit according to claim 1, wherein:

a main control circuit portion is formed chiefly of the microprocessor and the program memory and the main control circuit portion operates on an output voltage of a main power supply circuit fed from the in-vehicle battery via the output contact in the power supply relay while the program memory pre-stores a control program realizing a leakage detection control portion;

the in-vehicle electronic control unit further comprises a sub-power supply circuit fed directly from the in-vehicle battery, a sub-control circuit portion operating when fed from the sub-power supply circuit, and a soak timer forming the sub-control circuit portion and connected to the microprocessor in serial to each other via serial parallel converters;

the soak timer receives in advance a set value of waking hours from the microprocessor and stores the set value in one of a set value register and a current value resistor, starts a timekeeping operation according to a timekeeping start command signal received in a time zone during which the power supply switch is opened and the power supply relay is continuously fed by the self-hold command output, and generates a waking command signal output after an elapse of the set waking hours;

the energizing transistor energizes the power supply relay as a conduction drive signal is supplied from the waking command signal output via a drive resistor and a series diode;

the microprocessor de-energizes the power supply relay by stopping the self-hold command output when the timekeeping start command signal is sent, whereas the self-hold command output is generated again when the microprocessor is woken up and started in response to generation of the waking command signal output, stops the waking command signal output by sending a reset command to the soak timer, and stops again the self-hold command output after making determination as to whether there is a leakage narrow mouth of the fuel tank using the leakage detection control portion; and the leakage detection control portion further includes a refuel priority portion that runs the decompression processing portion with a higher priority and running of the leakage detection control portion is stopped when a running condition of the decompression processing portion is established while the leakage detection control portion is run.

7. The in-vehicle electronic control unit according to claim 6, wherein:

a decompression pump is installed in an air discharge channel of the canister and when an internal pressure of the fuel tank is high, the decompression processing portion continues to energize and open the sealing valve opening solenoid valve and drives the decompression pump at least once until the internal pressure of the fuel tank drops within the predetermined threshold range in the vicinity of the atmospheric pressure; and the leakage detection control portion energizes and opens the sealing valve opening solenoid valve and drives the decompression pump to measure a change of a negative pressure in one of the fuel tank and a decompression pipe channel when the filler cap is closed, so that it is determined whether there is a leakage narrow mouth by comparing a measured value with a reference value.

8. The in-vehicle electronic control unit according to claim 6, wherein:

a filler lid closing detection switch is connected to one of the microprocessor and the sub-CPU as an input signal in addition to the filler lid opening detection switch;

an auxiliary switch that is closed under one of circumstances where the filler lid is closed and it is sure that the filler cap is closed and where the filler cap is closed is connected to the filler lid closing detection switch;

the filler lid opening detection switch and the filler lid open command switch supply an output voltage of the in-vehicle battery as an input signal voltage even when the power supply relay is not operating whereas the filler lid closing detection switch becomes effective as an input signal only when the power supply relay is operating; and the leakage detection control portion is run when the filler lid closing detection switch is closed.

9. The in-vehicle electronic control unit according to claim 1, wherein:

a main control circuit portion is formed chiefly of the microprocessor and the program memory and the main control circuit portion operates on an output voltage of a main power supply circuit fed from the in-vehicle battery via the output contact in the power supply relay and the program memory further pre-stores a control program realizing a leakage detection control portion;

the electronic control unit further comprises a sub-power supply circuit fed directly from the in-vehicle battery and a sub-control circuit portion that operates when fed from the sub-power supply circuit;

the sub-control circuit portion has a sub-CPU that is connected to the microprocessor in serial to each other via serial and parallel converters and operates in cooperation with an auxiliary program memory, and the sub-CPU receives inputs from at least the filler lid open command switch and the filler lid opening detection switch, energizes the power supply relay by generating a waking command signal output, and sends a decompression processing request signal when one of the filler lid open command switch and the filler lid opening detection switch is closed;

the auxiliary program memory pre-stores a control program realizing a soak timer and the soak timer receives in advance a set value of waking hours from the microprocessor and stores the set value in an auxiliary RAM memory, starts a timekeeping operation according to a timekeeping start command signal received in a time zone during which the power supply switch is opened and the power supply relay is continuously fed by the self-hold command output, energizes the power supply relay by generating the waking command signal output, and sends a leakage detection request signal upon elapse of the set waking hours;

the microprocessor de-energizes the power supply relay by stopping the self-hold command output when the timekeeping start command signal is sent, generates again the self-hold command output when woken up and started in response to generation of the waking command signal output, stops the waking command signal output by sending a reset command to the sub-CPU, and stops the self-hold command again after one of an action to make a determination as to whether there is a leakage narrow mouth of the fuel tank using the leakage detection control portion and an action to perform decompression processing using the decompression processing portion depending on a content of the request signal; and the leakage detection control portion further includes a refuel priority portion that runs the decompression processing portion with a higher priority and running of the leakage detection control portion is stopped when the decompression processing request signal is generated while the leakage detection control portion is run.

10. The in-vehicle electronic control unit according to claim 9, wherein:

an exciting coil in the power supply relay is driven when fed from the in-vehicle battery via the energizing transistor;

conduction drive signals are supplied to the energizing transistor from each of the power supply switch, the waking command signal output, and the self-hold command output via corresponding drive resistors and corresponding series diodes and the auxiliary program memory pre-stores a control program realizing a timed energizing portion;

the timed energizing portion generates the waking command signal output in the predetermined limit period when one of the filler lid open command switch and the filler lid opening detection switch is closed;

the timed energizing portion memorizes issuance of the decompression processing request to be sent to the microprocessor upon generation of the waking command signal output and once the decompression processing request is issued, inhibits generation of the waking command output signal until occurrence of one of an event that filler lid opening detection switch is opened and an event that the filler lid open command switch is closed again; and the predetermined limit period is equal to or longer than a response delay time since the power supply relay is energized until the microprocessor starts to operate normally and equal to or shorter than the predetermined cut-off threshold time that is a set time in the cut-off timer.

11. The in-vehicle electronic control unit according to claim 9, wherein:

a decompression pump is installed in an air discharge channel of the canister and when an internal pressure of the fuel tank is high, the decompression processing portion continues to energize and open the sealing valve opening solenoid valve and drives the decompression pump at least once until the internal pressure of the fuel tank drops within the predetermined threshold range in the vicinity of the atmospheric pressure; and the leakage detection control portion energizes and opens the sealing valve opening solenoid valve and drives the decompression pump to measure a change of a negative pressure in one of the fuel tank and a decompression pipe channel when the filler cap is closed, so that it is determined whether there is a leakage narrow mouth by comparing a measured value with a reference value.

12. The in-vehicle electronic control unit according to claim 9, wherein:

a filler lid closing detection switch is connected to one of the microprocessor and the sub-CPU as an input signal in addition to the filler lid opening detection switch;

an auxiliary switch that is closed under one of circumstances where the filler lid is closed and it is sure that the filler cap is closed and where the filler cap is closed is connected to the filler lid closing detection switch;

the filler lid opening detection switch and the filler lid open command switch supply an output voltage of the in-vehicle battery as an input signal voltage even when the power supply relay is not operating whereas the filler lid closing detection switch becomes effective as an input signal only when the power supply relay is operating; and the leakage detection control portion is run when the filler lid closing detection switch is closed.

* * * * *